(12) United States Patent
Yoshimura et al.

(10) Patent No.: US 10,559,095 B2
(45) Date of Patent: Feb. 11, 2020

(54) IMAGE PROCESSING APPARATUS, IMAGE PROCESSING METHOD, AND MEDIUM

(71) Applicant: CANON KABUSHIKI KAISHA, Tokyo (JP)

(72) Inventors: Kazuhiro Yoshimura, Kawasaki (JP); Tatsuro Koizumi, Niiza (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/686,491

(22) Filed: Aug. 25, 2017

(65) Prior Publication Data

US 2018/0061086 A1 Mar. 1, 2018

(30) Foreign Application Priority Data

Aug. 31, 2016 (JP) ................................ 2016-170069
Aug. 14, 2017 (JP) ................................ 2017-156642

(51) Int. Cl.
*G06T 11/00* (2006.01)
*G06T 7/73* (2017.01)
(Continued)

(52) U.S. Cl.
CPC ............ *G06T 11/001* (2013.01); *G06T 5/003* (2013.01); *G06T 5/50* (2013.01); *G06T 7/75* (2017.01);
(Continued)

(58) Field of Classification Search
CPC . G06T 2207/10016; G06T 2207/10052; G06T 17/00; G06T 7/55; G06T 7/593; G06T 7/97; G06T 2200/04; G06T 7/70; G06T 19/00; G06T 7/60; G06T 15/00; G06T 7/74; G06T 2207/10012; G06T 15/20; G06T 2200/21; G06T 2207/10024; G06T 7/557; G06T 7/85; G06T 15/02; G06T 15/205; G06T 2207/20021;
(Continued)

(56) References Cited

U.S. PATENT DOCUMENTS 6,016,439 A * 1/2000 Acker ...................... A61B 5/06
600/411
6,072,496 A * 6/2000 Guenter ............. G06K 9/00201
345/419

(Continued)

FOREIGN PATENT DOCUMENTS

JP 6011224 B2 8/2012

*Primary Examiner* — Aklilu K Woldemariam
(74) *Attorney, Agent, or Firm* — Rossi, Kimms & McDowell LLP

(57) ABSTRACT

There is provided with an image processing apparatus. A determination unit determines color information of an object present in an object image from a virtual viewpoint. The color information of the object is determined by combining color information of the object in a captured image obtained by one or more image capturing apparatus selected based on position and orientation information of the virtual viewpoint, position and orientation information of the image capturing apparatuses, and position information of the object, by using a weight corresponding to an image capturing direction of the one or more image capturing apparatus and a position of the object in a field of view of the one or more image capturing apparatus.

12 Claims, 17 Drawing Sheets

(51) Int. Cl.
*G06T 7/90* (2017.01)
*G06T 15/20* (2011.01)
*G06T 5/00* (2006.01)
*G06T 5/50* (2006.01)
*H04N 5/247* (2006.01)

(52) U.S. Cl.
CPC ............... *G06T 7/90* (2017.01); *G06T 15/20* (2013.01); *H04N 5/247* (2013.01); *G06T 2207/10024* (2013.01); *G06T 2207/10028* (2013.01); *G06T 2207/20221* (2013.01); *G06T 2207/30244* (2013.01)

(58) Field of Classification Search
CPC ........... G06T 2207/30221; G06T 3/005; G06T 5/005; G06T 5/006; G06T 5/008; G06T 5/20; G06T 5/50; G06T 7/194; G06T 11/001; G06T 15/04; G06T 19/003; G06T 2207/10028; G06T 2207/20081; G06T 2207/20221; G06T 2207/30241; G06T 2207/30244; G06T 5/003; G06T 7/248; G06T 7/75; G06T 7/90; G06K 9/6255; G06K 9/00201; G06K 9/00664; G06K 2209/23; G06K 9/00; G06K 9/00208; G06K 9/346; G06K 9/36; G06K 9/4671; G06K 9/6202; G06K 9/6215; H04N 7/181; H04N 13/275; H04N 13/349; H04N 13/279; H04N 13/117; H04N 21/21805; H04N 13/128; H04N 13/232; H04N 13/243; H04N 2013/0081; H04N 2013/0088; H04N 9/097; H04N 13/0242; H04N 7/185; H04N 13/282; H04N 5/23203; H04N 5/23229; H04N 5/247; G06F 17/30247; G06F 3/04815; G06F 17/30256; G06F 17/30268; A61B 90/36; A61B 5/05; G02B 2027/014; G02B 2027/0127; G02B 27/0075; G02B 27/2271

USPC ........ 382/103, 154, 167, 293; 345/419, 420, 345/421, 422, 423, 424, 630
See application file for complete search history.

(56) References Cited

U.S. PATENT DOCUMENTS

| | | | | |
|---|---|---|---|---|
| 2003/0044066 | A1* | 3/2003 | Sakaguchi | H04N 5/2354 382/168 |
| 2003/0228052 | A1* | 12/2003 | Yamaguchi | G06T 11/001 382/154 |
| 2006/0018539 | A1* | 1/2006 | Sato | G06K 9/36 382/173 |
| 2007/0122027 | A1* | 5/2007 | Kunita | H04N 13/243 382/154 |
| 2008/0024523 | A1* | 1/2008 | Tomite | G06T 15/50 345/632 |
| 2009/0128548 | A1* | 5/2009 | Gloudemans | G06K 9/346 345/419 |
| 2009/0128568 | A1* | 5/2009 | Gloudemans | G06K 9/346 345/474 |
| 2009/0129630 | A1* | 5/2009 | Gloudemans | G06T 15/20 382/103 |
| 2010/0026712 | A1* | 2/2010 | Aliprandi | H04N 13/111 345/629 |
| 2010/0090929 | A1* | 4/2010 | Tsujimoto | G06T 5/006 345/7 |
| 2011/0254958 | A1* | 10/2011 | Kotani | G06T 15/205 348/159 |
| 2012/0113092 | A1* | 5/2012 | Bar-Zeev | G02B 27/017 345/419 |
| 2012/0229628 | A1* | 9/2012 | Ishiyama | H04N 5/23212 348/135 |
| 2014/0068958 | A1* | 3/2014 | Kubo | G01B 5/016 33/559 |
| 2014/0267243 | A1* | 9/2014 | Venkataraman | G06T 7/557 345/419 |
| 2018/0011514 | A1* | 1/2018 | Yoo | G06F 1/1652 |

* cited by examiner

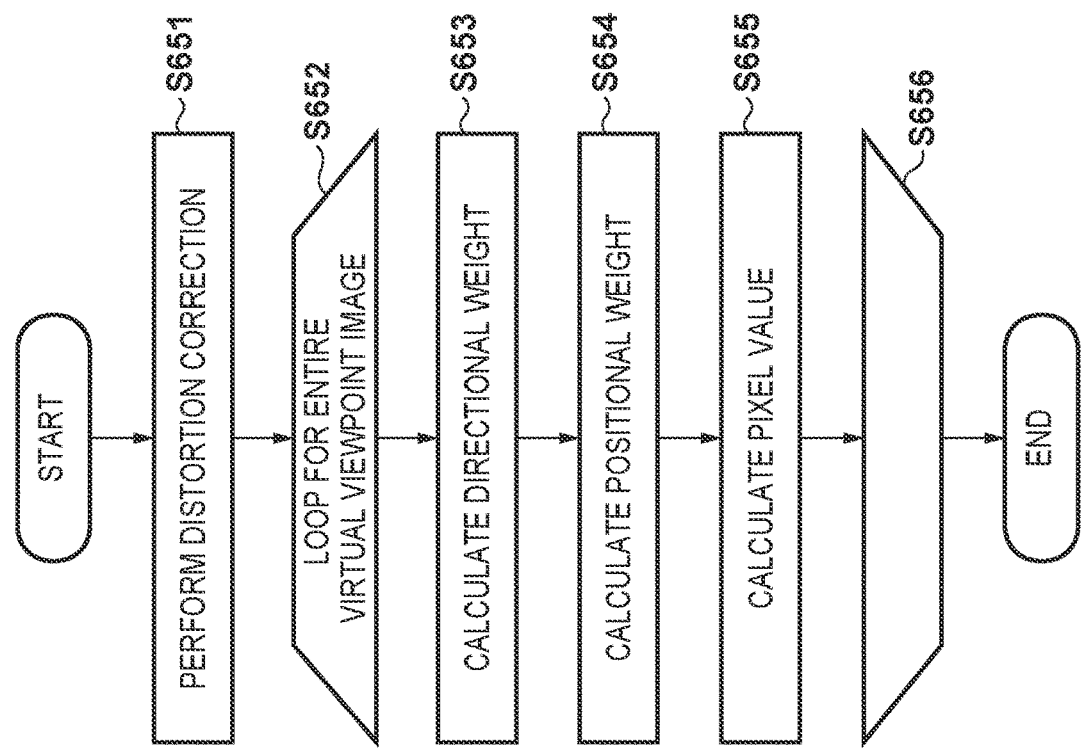
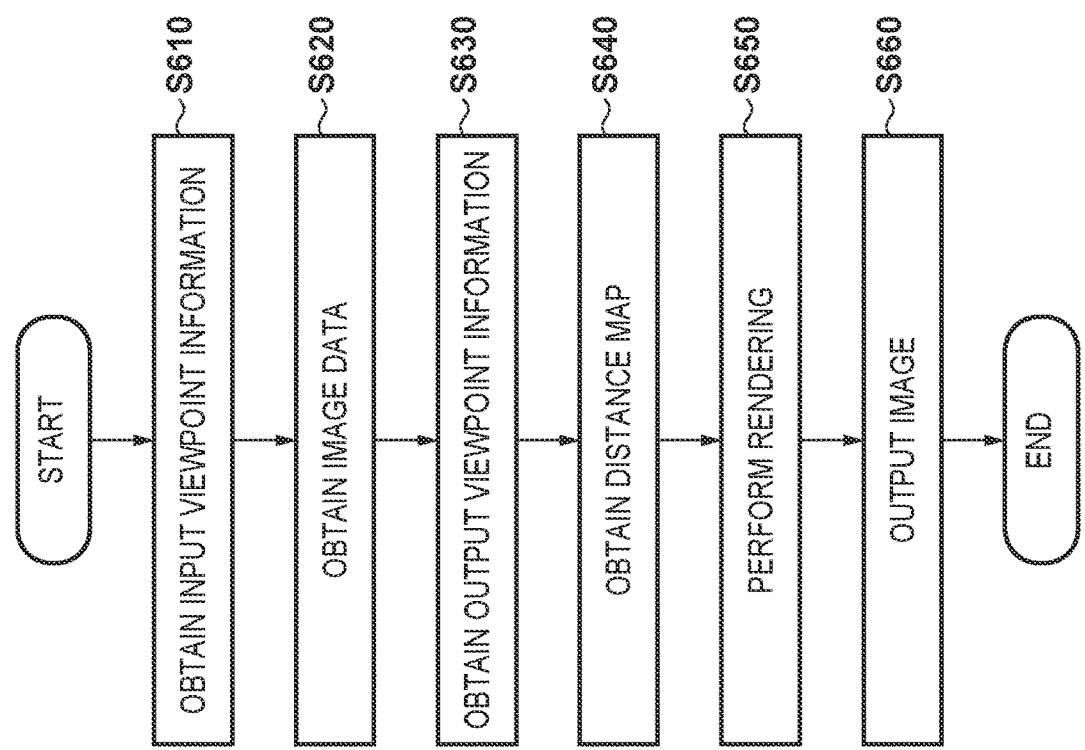

FIG. 14A

|  | INITIAL VALUE | AFTER FIRST UPDATE | AFTER SECOND UPDATE | AFTER THIRD UPDATE | AFTER FOURTH UPDATE |
|---|---|---|---|---|---|
| INPUT VIEWPOINT 1 | 0.3 | 0.2 | 0.1 | 0 | 0 |
| INPUT VIEWPOINT 2 | 0.1 | 0 | 0 | 0 | 0 |
| INPUT VIEWPOINT 3 | 0.2 | 0.1 | 0 | 0 | 0 |
| INPUT VIEWPOINT 4 | 0.4 | 0.3 | 0.2 | 0.1 | 0 |
| INPUT VIEWPOINT 5 | 0 | 0 | 0 | 0 | 0 |

FIG. 14B

|  | INITIAL VALUE | AFTER FIRST UPDATE | AFTER SECOND UPDATE | AFTER THIRD UPDATE | AFTER FOURTH UPDATE |
|---|---|---|---|---|---|
| INPUT VIEWPOINT 1 | 1 | 1 | 1 | 0 | 0 |
| INPUT VIEWPOINT 2 | 1 | 0 | 0 | 0 | 0 |
| INPUT VIEWPOINT 3 | 1 | 1 | 0 | 0 | 0 |
| INPUT VIEWPOINT 4 | 1 | 1 | 1 | 1 | 0 |
| INPUT VIEWPOINT 5 | 0 | 0 | 0 | 0 | 0 |

FIG. 14C

|  | FIRST UPDATE | SECOND UPDATE | THIRD UPDATE | FOURTH UPDATE |
|---|---|---|---|---|
| VIEWPOINT WITH MINIMUM WEIGHT | 2 | 3 | 1 | 4 |
| MINIMUM POSITIONAL WEIGHT | 0.1 | 0.1 | 0.1 | 0.1 |
| NUMBER OF EFFECTIVE VIEWPOINT | 4 | 3 | 2 | 1 |
| COMBINED POSITIONAL WEIGHT | 0.4 | 0.3 | 0.2 | 0.1 |

FIG. 14D

|  | COUNTERCLOCKWISE | CLOCKWISE |
|---|---|---|
| INPUT VIEWPOINT 1 | 160 | 200 |
| INPUT VIEWPOINT 2 | 80 | 280 |
| INPUT VIEWPOINT 3 | 350 | 10 |
| INPUT VIEWPOINT 4 | 300 | 60 |
| INPUT VIEWPOINT 5 | 220 | 140 |

FIG. 14E

|  | FIRST UPDATE | SECOND UPDATE | THIRD UPDATE | FOURTH UPDATE |
|---|---|---|---|---|
| INPUT VIEWPOINT 1 | 0.00 | 0.06 | 0.27 | 0.00 |
| INPUT VIEWPOINT 2 | 0.11 | 0.00 | 0.00 | 0.00 |
| INPUT VIEWPOINT 3 | 0.89 | 0.94 | 0.00 | 0.00 |
| INPUT VIEWPOINT 4 | 0.00 | 0.00 | 0.73 | 1.00 |
| INPUT VIEWPOINT 5 | 0.00 | 0.00 | 0.00 | 0.00 |

FIG. 14F

|  | FIRST UPDATE | SECOND UPDATE | THIRD UPDATE | FOURTH UPDATE |
|---|---|---|---|---|
| INPUT VIEWPOINT 1 | 0.00 | 0.02 | 0.05 | 0.00 |
| INPUT VIEWPOINT 2 | 0.04 | 0.00 | 0.00 | 0.00 |
| INPUT VIEWPOINT 3 | 0.36 | 0.28 | 0.00 | 0.00 |
| INPUT VIEWPOINT 4 | 0.00 | 0.00 | 0.15 | 0.10 |
| INPUT VIEWPOINT 5 | 0.00 | 0.00 | 0.00 | 0.00 |

FIG. 14G

|  | INITIAL VALUE | AFTER FIRST UPDATE | AFTER SECOND UPDATE | AFTER THIRD UPDATE | AFTER FOURTH UPDATE |
|---|---|---|---|---|---|
| INPUT VIEWPOINT 1 | 0.00 | 0.00 | 0.02 | 0.07 | 0.07 |
| INPUT VIEWPOINT 2 | 0.00 | 0.04 | 0.04 | 0.04 | 0.04 |
| INPUT VIEWPOINT 3 | 0.00 | 0.36 | 0.64 | 0.64 | 0.64 |
| INPUT VIEWPOINT 4 | 0.00 | 0.00 | 0.00 | 0.15 | 0.25 |
| INPUT VIEWPOINT 5 | 0.00 | 0.00 | 0.00 | 0.00 | 0.00 |

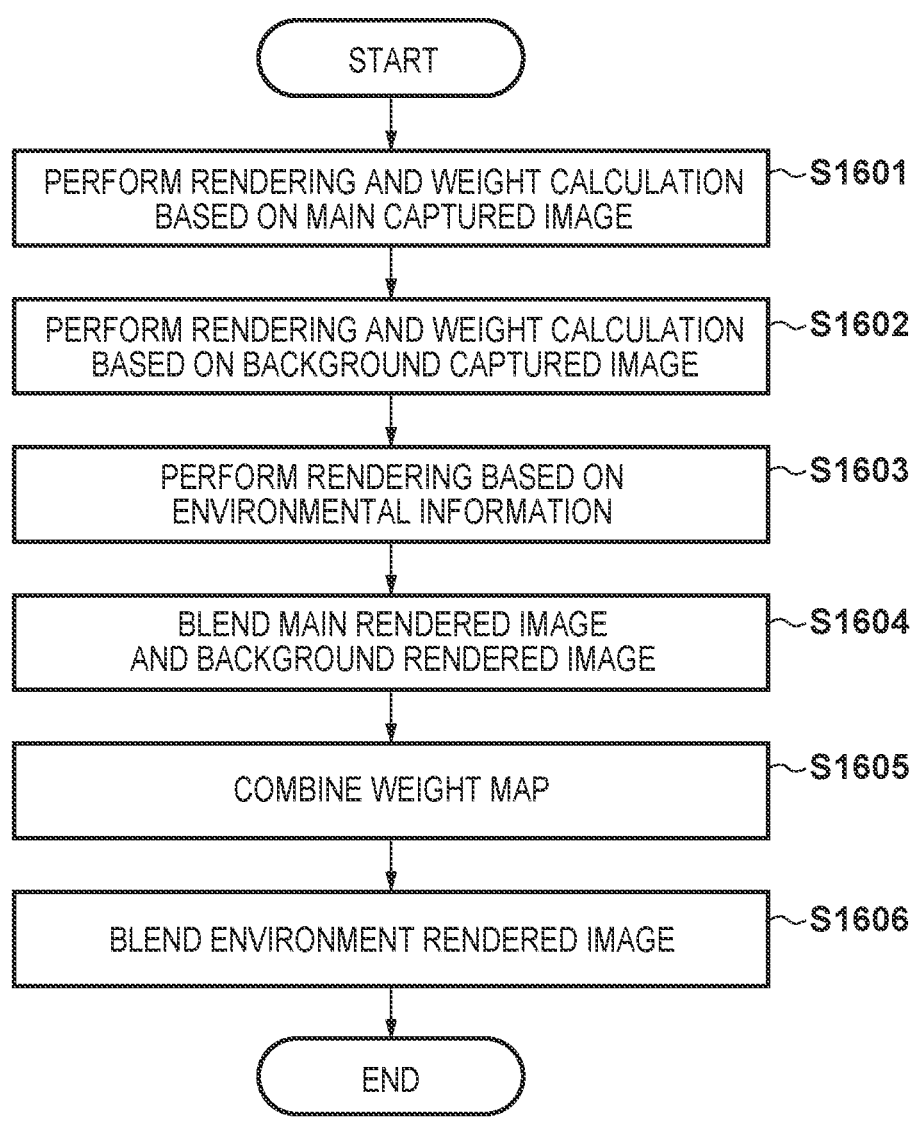

IMAGE PROCESSING APPARATUS, IMAGE PROCESSING METHOD, AND MEDIUM

BACKGROUND OF THE INVENTION

Field of the Invention

The present invention relates to an image processing apparatus, an image processing method, and a medium.

Description of the Related Art

There is known a technique of reconstructing, from images obtained by capturing an object using a plurality of image capturing apparatuses, an image which is obtained when an object is observed from an arbitrary virtual viewpoint. For example, Japanese Patent No. 5011224 discloses the following method. First, a three-dimensional model of an object is created by using captured images of the object captured by a plurality of cameras and the position information of each camera. Next, a texture image of each position on the three-dimensional model is generated by blending texture images included in the plurality of captured images. Finally, by texture mapping each blended texture image onto the three-dimensional model, an image can be reconstructed from a virtual viewpoint in which no camera is arranged.

Japanese Patent No. 5011224 also discloses a captured image selecting method used when generating a blended texture image in order to generate a reconstructed image that is close to a visually recognizable state from a virtual viewpoint. For example, Japanese Patent No. 5011224 proposes selecting a captured image of an object which has been captured by a camera positioned near the virtual viewpoint. As another method, Japanese Patent No. 5011224 also proposes selecting a captured image of an object which has been captured by a camera whose line-of-sight direction is close to that of the virtual viewpoint. Additionally, Japanese Patent No. 5011224 also discloses a technique of increasing the mixing ratio of captured images of an object captured by a camera positioned near the virtual view point or a camera whose line-of-sight direction is close to that of the virtual viewpoint.

SUMMARY OF THE INVENTION

According to an embodiment of the present invention, an image processing apparatus comprises: an obtaining unit configured to obtain position and orientation information of a virtual viewpoint, position and orientation information of a plurality of image capturing apparatuses, position information of an object, and a captured image captured by each of the plurality of image capturing apparatuses; and a determination unit configured to determine, from a captured image obtained from one or more of the plurality of image capturing apparatuses, color information of an object present in an object image from the virtual viewpoint, wherein the color information of the object is determined by combining the color information of the object in the captured image obtained by the one or more image capturing apparatus selected based on the position and orientation information of the virtual viewpoint, the position and orientation information of the image capturing apparatuses, and the position information of the object, by using a weight corresponding to an image capturing direction of the one or more image capturing apparatus and a position of the object in a field of view of the one or more image capturing apparatus.

According to another embodiment of the present invention, an image processing method comprising: obtaining position and orientation information of a virtual viewpoint, position and orientation information of a plurality of image capturing apparatuses, position information of an object, and a captured image captured by each of the plurality of image capturing apparatuses; and determining, from a captured image obtained from one or more of the plurality of image capturing apparatuses, color information of an object present in an object image from the virtual viewpoint, wherein the color information of the object is determined by combining the color information of the object in the captured image obtained by the one or more image capturing apparatus selected based on the position and orientation information of the virtual viewpoint, the position and orientation information of the image capturing apparatuses, and the position information of the object, by using a weight corresponding to an image capturing direction of the one or more image capturing apparatus and a position of the object in a field of view of the one or more image capturing apparatus.

According to still another embodiment of the present invention, a non-transitory computer-readable medium storing a program which, when executed by a computer comprising a processor and a memory, causes the computer to: obtain position and orientation information of a virtual viewpoint, position and orientation information of a plurality of image capturing apparatuses, position information of an object, and a captured image captured by each of the plurality of image capturing apparatuses; and determine, from a captured image obtained from one or more of the plurality of image capturing apparatuses, color information of an object present in an object image from the virtual viewpoint, wherein the color information of the object is determined by combining the color information of the object in the captured image obtained by the one or more image capturing apparatus selected based on the position and orientation information of the virtual viewpoint, the position and orientation information of the image capturing apparatuses, and the position information of the object, by using a weight corresponding to an image capturing direction of the one or more image capturing apparatus and a position of the object in a field of view of the one or more image capturing apparatus.

Further features of the present invention will become apparent from the following description of exemplary embodiments (with reference to the attached drawings).

BRIEF DESCRIPTION OF THE DRAWINGS

FIGS. 6A and 6B are flowcharts of the processing according to an embodiment;

FIGS. 14A to 14G are views for explaining a weight calculation method according to an embodiment.

FIG. 16 is a flowchart of the processing according to an embodiment;

DESCRIPTION OF THE EMBODIMENTS

Even if the same portion of an object is captured, the color of the portion in a captured image obtained by each image capturing apparatus may differ due to the influence of lighting and the like. Hence, an unnatural color change could be seen between regions in which captured images with particularly different colors have been blended.

One embodiment of the present invention provides a technique of reducing a sense of incongruity caused by color differences between regions in a reconstructed image obtained from a virtual viewpoint.

Embodiments of the present invention will be described below based on the accompanying drawings. The scope of the present invention is, however, not limited to the following embodiments.

First Embodiment

Figure 1:
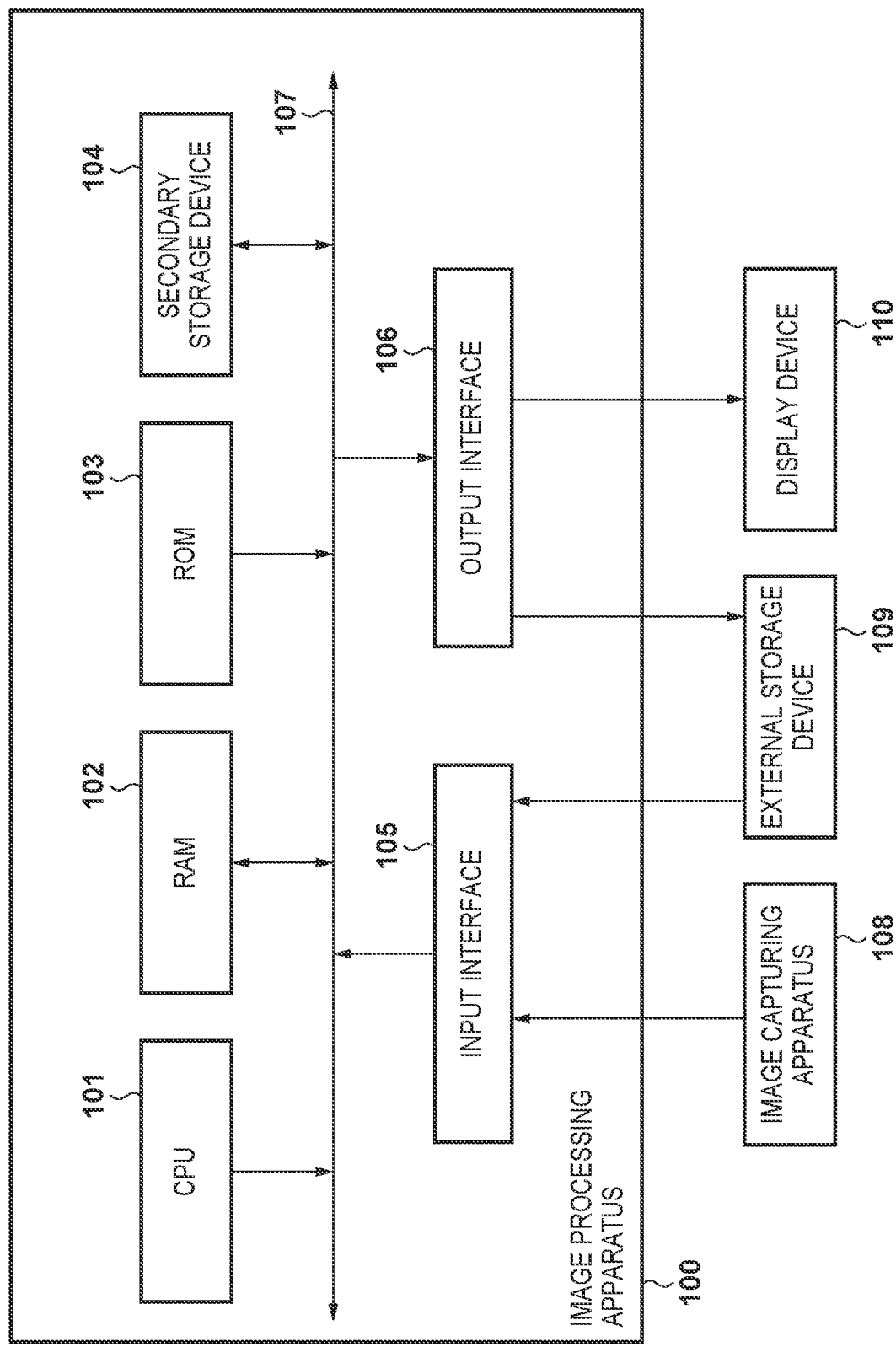
FIG. 1 is a block diagram showing an example of the hardware arrangement of an image processing apparatus according to an embodiment.

An image processing apparatus according to the first embodiment of the present invention will be described hereinafter. The image processing apparatus according to this embodiment can be, for example, a computer that includes a processor and a memory. FIG. 1 shows an example of the hardware arrangement of an image processing apparatus 100 according to this embodiment. A CPU 101 controls the overall image processing apparatus 100. A RAM 102 is a random access memory that temporarily stores a program or data. A ROM 103 is a read only memory that stores programs or parameters. A secondary storage device 104 is a storage device capable of long-term storage of programs or data and can be, for example, a hard disk or a memory card.

An input interface 105 is an interface that connects the image processing apparatus 100 to an input device. The input device is a device that inputs data into the image processing apparatus 100, and its type is not particularly limited. The input interface 105 can, for example, receive data from an image capturing apparatus 108 that captures an image of an object or from an external storage device 109. The image processing apparatus 100 can perform processing by using the received data. An output interface 106 is an interface that connects the image processing apparatus 100 to an output device. The output device is a device that receives data from the image processing apparatus 100, and its type is not particularly limited. The output interface 106 can, for example, output data from the image processing apparatus 100 to the external storage device 109 or a display device 110.

The operations of respective units to be described below, as that shown in FIG. 3, can be implemented as follows. That is, a program corresponding to the operation of each unit stored in a computer-readable storage medium such as the ROM 103, the secondary storage device 104, the external storage device 109, or the like is loaded into the RAM 102. Then, the operation of each unit to be described below can be implemented by the CPU 101 operating in accordance with this program. Some or all of the operations of the respective units to be described below may be implemented by dedicated hardware such as ASIC or the like, as a matter of course.

Figure 2A:
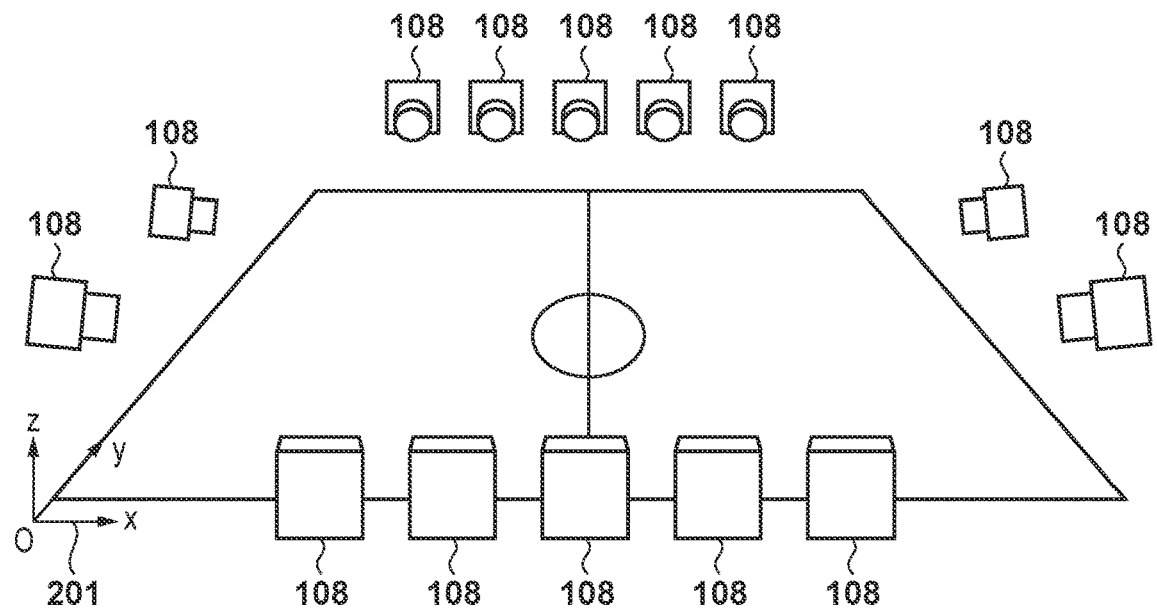
FIGS. 2A and 2B are views showing arrangement examples of an image processing system according to an embodiment.
Figure 2B:
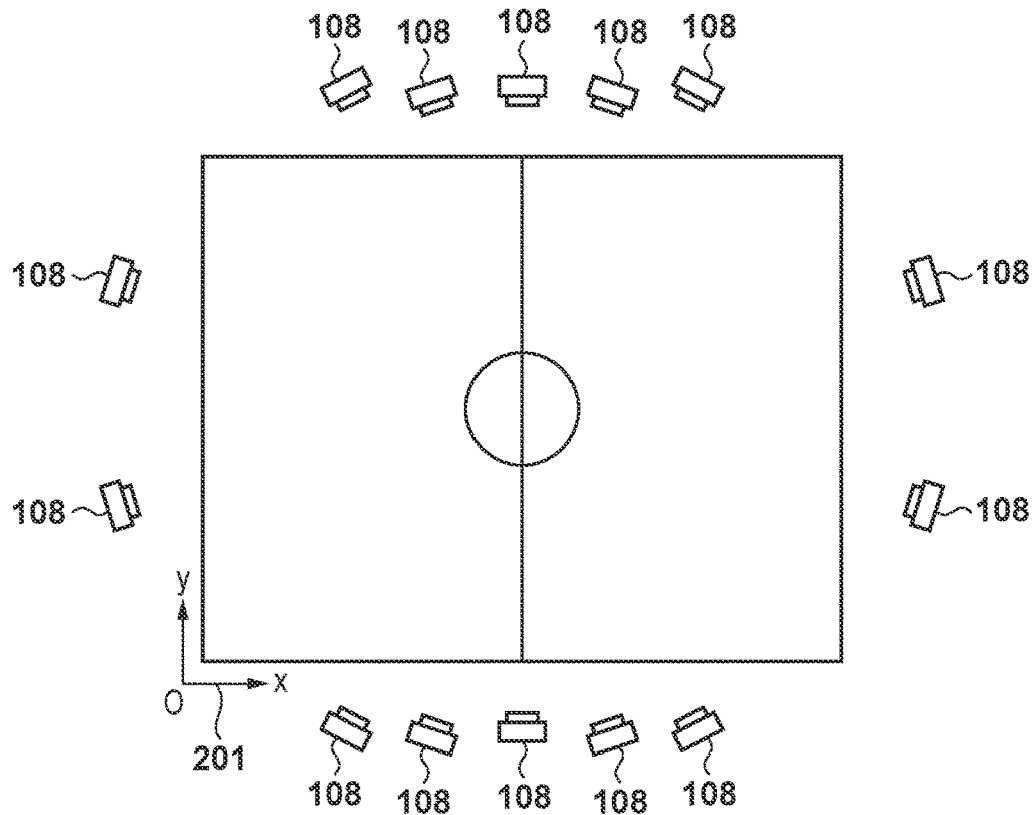

The image processing apparatus 100 according to this embodiment performs processing to generate a reconstructed image from a virtual viewpoint by obtaining captured images from a plurality of image capturing apparatuses 108 that capture images of an object. In this specification, a reconstructed image is a virtual viewpoint image of an object (an object image) generated based on a virtual viewpoint and corresponds to the captured image of the object that may be obtained if a virtual camera has been arranged at the virtual viewpoint. A reconstructed image is also called a free viewpoint image. These plurality of image capturing apparatuses 108 can, for example, be arranged to surround the object. The arrangement examples of such image capturing apparatuses 108 are shown in FIGS. 2A and 2B. FIGS. 2A and 2B are views showing the image capturing apparatuses 108 arranged in a gymnasium, and a world coordinate system 201 is shown in each view. As shown in FIG. 2A, the image capturing apparatuses 108 are arranged so as to look down from above to the floor surface, and the image capturing apparatuses 108 are also arranged, as shown in FIG. 2B, along the side surfaces of the gymnasium. These image capturing apparatuses 108 can synchronize and capture the floor surface and the side surfaces of the gymnasium, an object such as a person active in the gymnasium, and the like from various directions. This allows the plurality of image capturing apparatuses 108 to generate captured images of the object from various directions at the same time. The arrangement method of the image capturing apparatuses 108 shown in FIGS. 2A and 2B is merely an example, and another arrangement method may be adopted, as a matter of course.

In FIG. 1, the image processing apparatus 100 is connected to the plurality of image capturing apparatuses 108 and forms an image processing system that includes the image processing apparatus 100 and the plurality of image capturing apparatuses 108. According to such an arrangement, a reconstructed image can be generated in real time from a virtual viewpoint. However, it is not always necessary to connect the image capturing apparatuses 108 to the image processing apparatus 100, and the image processing apparatus 100 may, for example, obtain the captured images from the respective image capturing apparatuses 108 via a storage medium. Note that each image capturing apparatus 108 may capture a moving image. In this case, the image processing apparatus 100 can use frame images captured at approximately the same time by the plurality of image capturing apparatuses 108 and perform the following processing.

Figure 3:
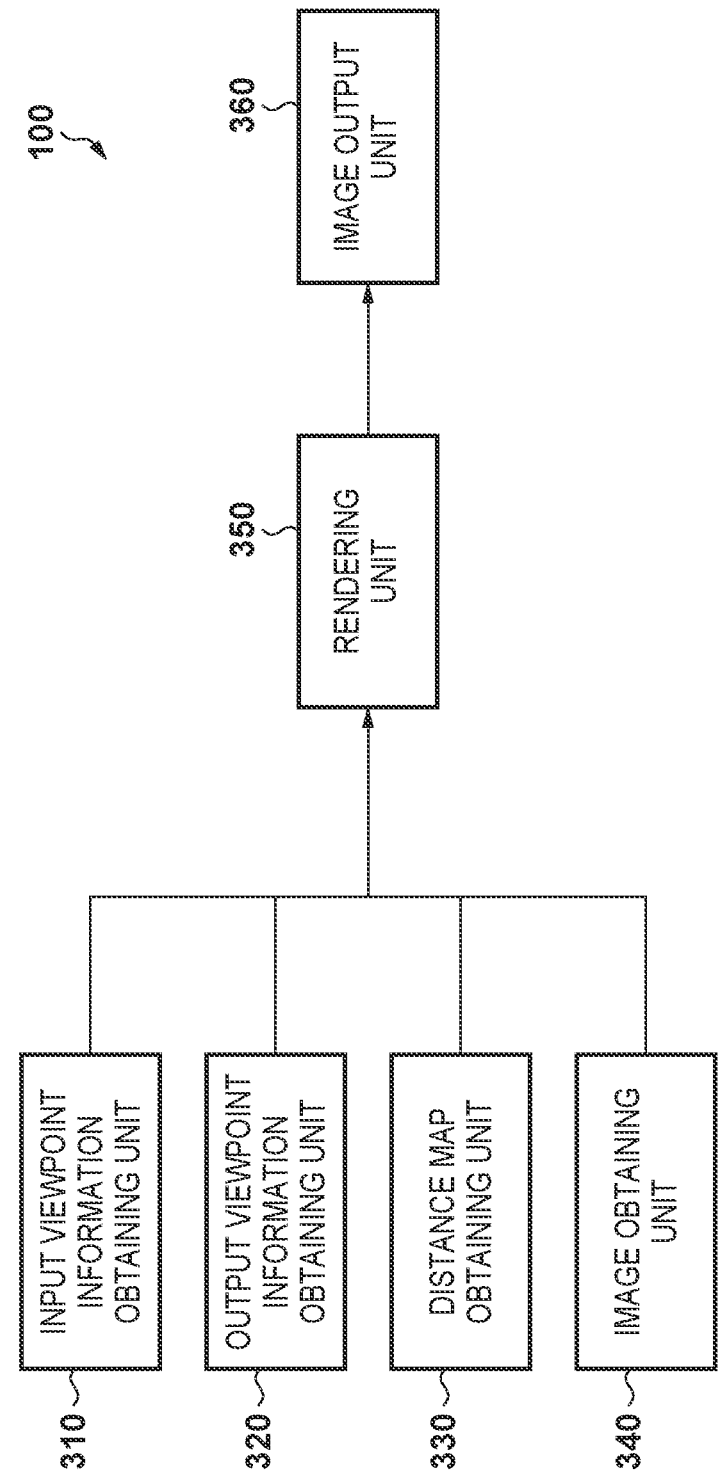
FIG. 3 is a block diagram showing an example of the functional arrangement of the image processing apparatus according to an embodiment.

FIG. 3 shows the functional arrangement provided in the image processing apparatus 100 according to this embodiment. As shown in FIG. 3, the image processing apparatus 100 includes an input viewpoint information obtaining unit 310, an output viewpoint information obtaining unit 320, a distance map obtaining unit 330, an image obtaining unit 340, a rendering unit 350, and an image output unit 360.

The input viewpoint information obtaining unit 310 and the output viewpoint information obtaining unit 320 obtain the position and orientation information of the plurality of image capturing apparatuses and the position and orientation information of a virtual viewpoint, respectively. In this embodiment, the input viewpoint information obtaining unit 310 obtains information (to be referred to as input viewpoint information hereinafter) related to an input viewpoint. In this embodiment, an input viewpoint indicates the viewpoint of each image capturing apparatus 108, and input viewpoint information represents information of each of the plurality of image capturing apparatuses 108. The input viewpoint information includes the position and orientation information of each image capturing apparatus 108 in a predetermined coordinate system and includes, for example, the orientation information indicating the optical-axis direction and the position information of the image capturing apparatus 108. The input viewpoint information can also include the angle-of-view information, such as the focal distance or the principal point, of the image capturing apparatus 108. These pieces of information can be used to associate each pixel of a captured image and the direction from the image capturing apparatus 108 to the object. Hence, a corresponding pixel on the captured image can be identified with respect to a specific portion of the object, and the color information can be obtained. Furthermore, the input viewpoint information can include a distortion parameter which indicates the distortion of an image captured by the image capturing apparatus 108 and imaging parameters such as the f-number, the shutter speed, and white balance.

Also, in this embodiment, the output viewpoint information obtaining unit 320 obtains information (to be referred to as output viewpoint information hereinafter) related to an output viewpoint. In this embodiment, an output viewpoint indicates the virtual viewpoint of a reconstructed image generated by the image processing apparatus 100, and output viewpoint information represents information about the virtual viewpoint. The output viewpoint information includes, similarly to the input viewpoint information, the position and orientation information of the virtual viewpoint in the predetermined coordinate system and includes, for example, the orientation information indicating an optical-axis direction and the position information of the virtual viewpoint. In addition, the output viewpoint information can include the angle-of-view information from the virtual viewpoint, resolution information of the reconstructed image, and the like. Furthermore, the output viewpoint information can also include the distortion parameter and the imaging parameters and perform image processing on the reconstructed image obtained by using these parameters.

The input viewpoint information obtaining unit 310 and the output viewpoint information obtaining unit 320 may obtain information indicating the relative position and orientation relationship between each image capturing apparatus and a virtual viewpoint instead of obtaining the position and orientation information of each image capturing apparatus 108 and the position and orientation information of the virtual viewpoint.

The distance map obtaining unit 330 obtains the position information of an object in a space. This position information indicates the relative positional relationship between a virtual viewpoint and the object. In this embodiment, the distance map obtaining unit 330 obtains a distance map (depth map) from the virtual viewpoint to the object. The method of generating a distance map based on the captured images of the object obtained by the plurality of image capturing apparatuses 108 is known, and an arbitrary method can be adopted. For example, a three-dimensional model of the object can be generated by using a stereo matching method or a volume intersection method disclosed in Japanese Patent No. 5011224. Based on the relationship between the virtual viewpoint and the three-dimensional model of the object, the distance from the virtual viewpoint to the corresponding object is obtained for each pixel of the reconstructed image from the virtual point, thereby generating a distance map. The distance map generation method is not limited to the method based on captured images of the object. A three-dimensional model of the object may be generated by using some kind of a tracker, and a distance map may be generated based on this three-dimensional model. In addition, a distance map may be obtained by measuring the distance between the virtual viewpoint and the corresponding object in advance by a range sensor.

The image obtaining unit 340 obtains the captured image of the object captured by each of the plurality of image capturing apparatuses 108.

The rendering unit 350 determines, from the plurality of captured images, the color information of an object present in each direction from a virtual viewpoint. For example, the rendering unit 350 can generate a reconstructed image from the virtual viewpoint by referring to the position information (the distance map obtained by the distance map obtaining unit 330) of the object, the input viewpoint information (the position and orientation information of each image capturing apparatus 108), and the output viewpoint information (the position and orientation information of the virtual viewpoint). At this time, the rendering unit 350 obtains, from each of the captured images of the object obtained by the image obtaining unit 340, the color information of the object present in the direction of interest from the virtual viewpoint. Then, the rendering unit 350 determines the color information of the object present in the direction of interest by combining the obtained color information by using a weight corresponding to the direction of each image capturing apparatus and the position of the object in the field of view of the image capturing apparatus (to be described later). The rendering unit 350 generates a reconstructed image by thus determining the color information of the object for each direction of interest corresponding to each pixel of the reconstructed image.

The image output unit 360 outputs the reconstructed image generated by the rendering unit 350. For example, the image output unit 360 outputs the reconstructed image to the display device 110 and can cause the display device 110 to display the reconstructed image.

The rendering unit 350 will be described in further detail next. First, the outline of the rendering processing will be described. The processing to be performed by the rendering unit 350 corresponds to processing of identifying the position of the object present in the direction of interest based on the distance map and extracting the color information of the object from each captured image. In other words, the rendering unit 350 identifies, for a pixel of interest in the reconstructed image, the position of the object in the pixel of interest based on the distance map and extracts the color information of the object in the pixel of interest from the captured image. More specifically, the rendering unit 350 can identify a pixel on the captured image corresponding to the object present in the direction of interest based on the distance from the virtual viewpoint to the object present in the direction of interest and the position and orientation relationship between the virtual viewpoint and the image capturing apparatus. Thus, the rendering unit 350 can obtain the color information of the identified pixel as the color information of the object present in the direction of interest.

This processing can be performed, for example, as follows. In the following explanation, let $(u_0, v_0)$ be coordinates of a pixel of interest in a reconstructed image. The position of the object in the pixel of interest can be represented by a camera coordinate system of the output viewpoint in accordance with $$\begin{pmatrix} x_0 \\ y_0 \\ z_0 \end{pmatrix} = \frac{d_0(u_0, v_0)}{f_0} \begin{pmatrix} u_0 - c_{x0} \\ v_0 - c_{y0} \\ f_0 \end{pmatrix} \quad (1)$$

where $(x_0, y_0, z_0)$ represent the camera coordinates of the object. $d_0(u_0, v_0)$ represents the distance from the output viewpoint to the object in the pixel of interest indicated in the distance map. $f_0$ represents the focal distance of the output viewpoint, and $c_{x0}$ and $c_{y0}$ represent the principal points of the output viewpoint.

Next, the camera coordinates of the output viewpoint can be converted into world coordinates for the object in the pixel of interest in accordance with $$\begin{pmatrix} X_0 \\ Y_0 \\ Z_0 \end{pmatrix} = R_0^{-1} \begin{pmatrix} x_0 \\ y_0 \\ z_0 \end{pmatrix} + \begin{pmatrix} X_{output} \\ Y_{output} \\ Z_{output} \end{pmatrix} \quad (2)$$

where $(X_0, Y_0, Z_0)$ represent the world coordinates of the object. $R_0$ represents the optical-axis direction of the output viewpoint. $(X_{output}, Y_{output}, Z_{output})$ represent the camera position of the output viewpoint.

Next, the coordinates of the pixel on the captured image, obtained from the input viewpoint, which includes the object present in the world coordinates $(X_0, Y_0, Z_0)$, can be calculated in accordance with $$\begin{pmatrix} X_0 \\ Y_0 \\ Z_0 \end{pmatrix} = tR_i^{-1} \begin{pmatrix} u_i - c_{xi} \\ v_i - c_{yi} \\ f_i \end{pmatrix} + \begin{pmatrix} X_{cam,i} \\ Y_{cam,i} \\ Z_{cam,i} \end{pmatrix} \quad (3)$$

where $R_i$ represents the optical-axis direction of an input viewpoint i (the input viewpoint i is the ith input viewpoint of a plurality of input viewpoints). $(X_{cam,i}, Y_{cam,i}, Z_{cam,i})$ represents the camera position of the input viewpoint i. $f_i$ represents the focal distance of the input viewpoint i. $c_{xi}$ and $c_{yi}$ represent the principal points of the input viewpoint i. Also, t represents a constant. Solving equation (3) with respect to coordinates $(u_i, v_i)$ obtains equation (4).

$$\begin{pmatrix} u_i - c_{xi} \\ v_i - c_{yi} \\ f_i \end{pmatrix} = t^{-1} R_i \begin{pmatrix} X_0 - X_{cam,i} \\ Y_0 - Y_{cam,i} \\ Z_0 - Z_{cam,i} \end{pmatrix} \quad (4)$$

In accordance with equation (4), t can be obtained first, and the coordinates $(u_i, v_i)$ can be obtained by using the obtained t. In this manner, the coordinates $(u_0, v_0)$ of a pixel of interest in the reconstructed image can be converted into the coordinates $(u_i, v_i)$ of a pixel in a captured image. The possibility that the coordinates $(u_0, v_0)$ of the pixel of interest in the reconstructed image and the coordinates $(u_i, v_i)$ of the pixel in the captured image will correspond to the same object is high. Therefore, the pixel value (color information) of the coordinates $(u_i, v_i)$ of the pixel in the captured image can be used as the pixel value (color information) of the coordinates $(u_0, v_0)$ of the pixel of interest in the reconstructed image.

However, due to differences in the line-of-sight directions, the coordinates $(u_0, v_0)$ of the pixel of interest in the reconstructed image and the coordinates $(u_i, v_i)$ of the pixel in the captured image may not necessarily correspond to the same object. Also, even if they correspond to the same object, due to the influence of the light source direction or the like, the colors may vary between the captured images. Hence, in this embodiment, the rendering unit 350 identifies, from the plurality of captured images, the coordinates $(u_i, v_i)$ (i=1 to N: N is a number of the image capturing apparatuses 108) of the pixel corresponding to the coordinates $(u_0, v_0)$ of the pixel of interest, and the pixel values of the respective identified pixels are weighted and combined. Here, a captured image which does not include the object corresponding to the pixel of interest, due to a reason such as the object being outside the image capturing range, can be excluded as a target for the combining process. A pixel value obtained by weighting and combining in this way is used as the pixel value of the coordinates $(u_0, v_0)$ of the pixel of interest. In this manner, the color information of the object in each captured image obtained by one or more image capturing apparatuses can be used to determine the color information of the object in a reconstructed image. In one embodiment, the color information of the object in captured images obtained by two or more image capturing apparatuses can be used to determine the color information of the object in the reconstructed image.

Figure 4:
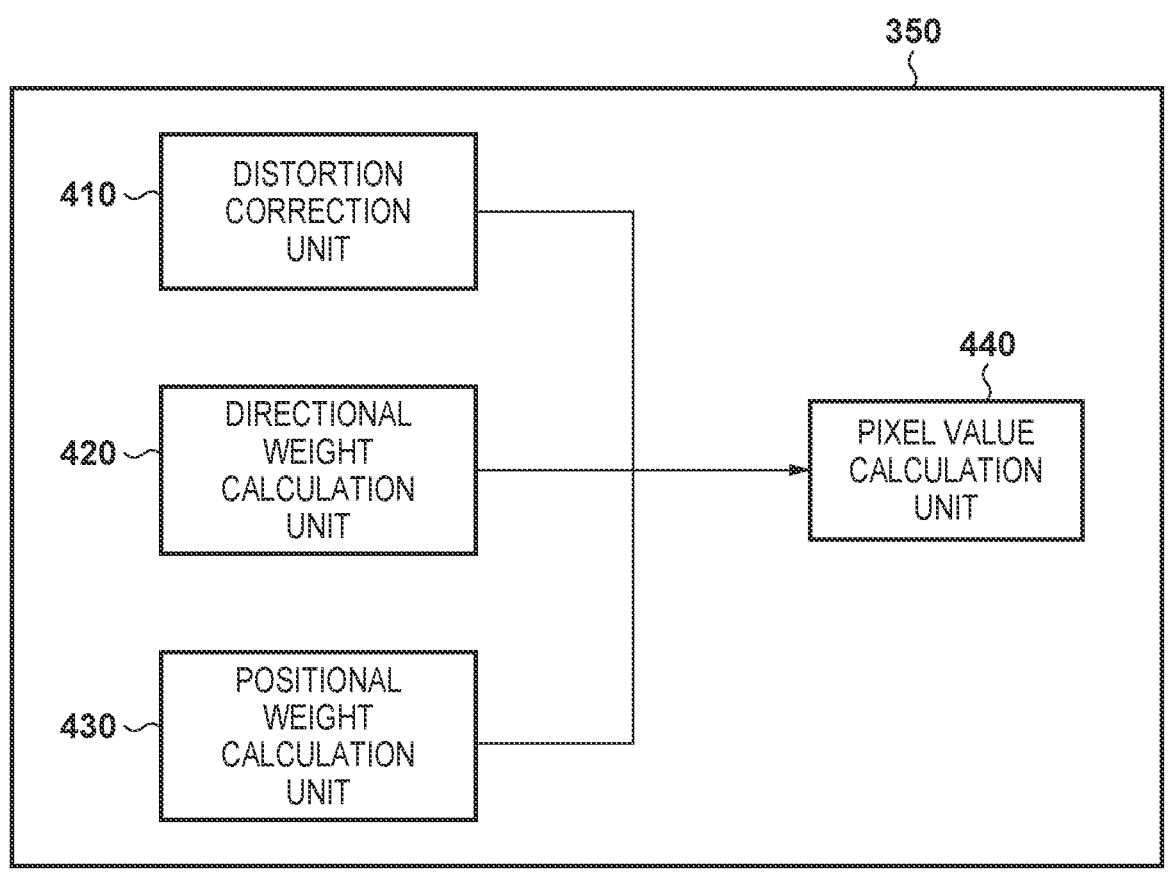
FIG. 4 is a block diagram showing another example of the functional arrangement of the image processing apparatus according to an embodiment.

The detailed arrangement of the rendering unit 350 will be described below with reference to FIG. 4. The rendering unit 350 includes a distortion correction unit 410, a directional weight calculation unit 420, a positional weight calculation unit 430, and a pixel value calculation unit 440.

The distortion correction unit 410 performs distortion correction processing on each captured image obtained by the image obtaining unit 340 and transmits the captured image that has undergone the distortion correction processing to the pixel value calculation unit 440. For example, the distortion correction unit 410 can perform the distortion correction processing on a captured image obtained by the image obtaining unit 340 by referring to the distortion parameter of each image capturing apparatus 108 obtained by the input viewpoint information obtaining unit 310. The distortion correction unit 410 may transmit the distortion-corrected captured image to the directional weight calculation unit 420 and the positional weight calculation unit 430. By generating a reconstructed image by using such a distortion-corrected captured image, it becomes possible to generate a reconstructed image with even less sense of incongruity. Note that it is not necessary for the rendering unit 350 to include the distortion correction unit 410, as a matter of course.

The directional weight calculation unit 420 sets a weight to each captured image in accordance with the direction of the corresponding image capturing apparatus. In this embodiment, the directional weight calculation unit 420 sets, in accordance with the relationship between the direction of the input viewpoint and the direction of the output viewpoint, a weight to each image capturing apparatus. It is considered that the closer the direction from the input viewpoint to the object is to the direction from the output viewpoint to the object, the closer the object image in the captured image is to the object image obtained from the virtual viewpoint. Hence, the closer the direction from the input viewpoint to the object is to the direction from the output viewpoint to the object, the larger the weight given to a captured image. More specifically, the smaller the angle formed by a direction vector (the magnitude is arbitrary) from the input viewpoint to the object and a direction vector (the magnitude is arbitrary) from the output viewpoint to the object, the larger the weight given to the captured image.

The directional weight calculation unit 420 can set different weights to the respective pixels in one captured image. In this case, the directional weight calculation unit 420 can use, as the direction of the corresponding image capturing apparatus, the direction from the image capturing apparatus to the object present in the direction of interest to set each weight. For example, in the aforementioned example, a weight can be set on the pixel $(u_i, v_i)$ in accordance with the direction from the output viewpoint for the pixel $(u_o, v_o)$ of interest in the reconstructed image and the direction from the input viewpoint for the corresponding pixel $(u_i, v_i)$ in the captured image. On the other hand, in order to simplify the calculation, the directional weight calculation unit 420 can also use the optical-axis direction of the image capturing apparatus (input viewpoint) as the direction of the image capturing apparatus (input viewpoint) to set the weight. In this manner, the same weight can be set for each pixel in one captured image. Also, in order to simplify the calculation, the direction of interest or the optical-axis direction of the output viewpoint can be used as the direction of the virtual viewpoint (output viewpoint). That is, the directional weight can be set in accordance with the angle formed between the direction of the image capturing apparatus and the optical-axis direction or the direction of interest of the virtual viewpoint.

The directional weight calculation unit 420 can calculate each directional weight when it becomes necessary for the processing by the pixel value calculation unit 440 or calculate, in advance, the directional weight for each pixel in the captured image before the processing by the pixel value calculation unit 440. In the latter case, the directional weight calculation unit 420 associates the weight calculated in the above-described manner to each pixel of the captured image. Subsequently, the pixel value calculation unit 440 uses, as the weight of the captured image, the directional weight associated with a pixel corresponding to the pixel of interest on the captured image when extracting, from the captured image, the pixel value of the object in the pixel of interest (to be described later).

The positional weight calculation unit 430 sets a weight to each captured image in accordance with the position of the object positioned in the direction of interest in the field of view of the corresponding image capturing apparatus. First, the reason for this arrangement will be described. Since the image capturing range from one input viewpoint is limited, all of the objects in a reconstructed image are rarely included in a captured image obtained from one input viewpoint. Hence, the reconstructed image often includes a region where the color information of a captured image is reflected because an object is in the captured image obtained from one input viewpoint and a region where the color information of the captured image is not reflected because the object is not in the captured image obtained from the one input viewpoint. On the other hand, the directional weight calculation unit 420 gives a larger weight to a captured image obtained from an input viewpoint which has a direction which is particularly close to that of the output viewpoint.

Figure 5A:
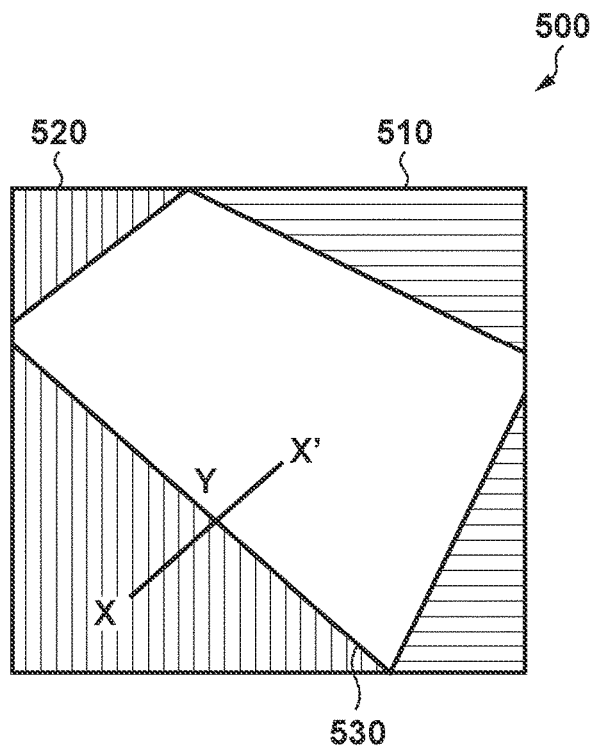
FIGS. 5A to 5C are views for conceptually explaining processing according to an embodiment.
Figure 5B:
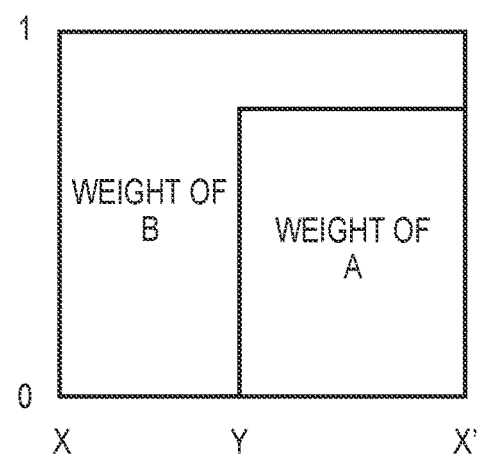

For example, a reconstructed image 500 shown in FIG. 5A includes a region 510 included in the field of view from an input viewpoint A, a region 520 included in the field of view from an input viewpoint B, and a region 530 included in the field of views of both the input viewpoint A and the input viewpoint B. In other words, the region 510 is a region that is only in a captured image A obtained from the input viewpoint A, the region 520 is a region that is only in a captured image B obtained from the input viewpoint B, and the region 530 is a region in both captured images A and B. FIG. 5B shows an example of the weights of the respective captured images A and B taken along a line X-X' in FIG. 5A. In this example, compared to the input viewpoint B, since the direction of the input viewpoint A is closer to the direction of the output viewpoint, a larger weight has been given to the captured image A. As is obvious from FIG. 5B, the contribution of the captured image A greatly differs between the region 530 where the captured image A makes a large contribution and the region 520 where the captured image A makes no contribution. Hence, the color may change sharply near a boundary Y between the region 520 and the region 530.

Figure 5C:
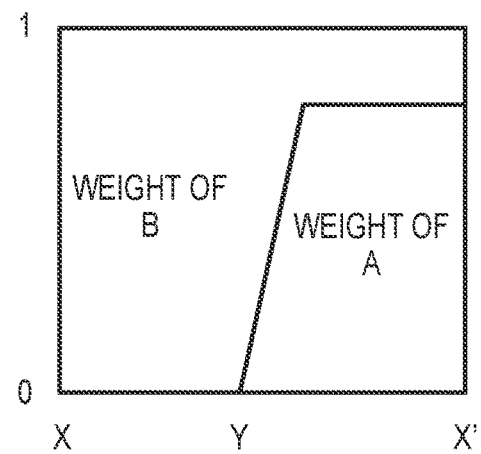

In this embodiment, in a case in which an object present in the direction of interest is present in the peripheral portion of the field of view of an image capturing apparatus, the positional weight calculation unit 430 sets a smaller weight than that in a case in which the object is present in a central portion of the field of view of the image capturing apparatus. That is, when the object corresponds to the peripheral portion of the field of view from the input viewpoint, the positional weight calculation unit 430 sets a smaller weight than that when the object corresponds to the central portion of the field of view. As a result, when the object is positioned in a peripheral portion in the field of view from the input viewpoint, the directional weight of the captured image can be effectively decreased. In the example of FIG. 5C, for each pixel near the boundary Y in the above-described region 530, a pixel in the captured image A is set to have a smaller weight and a pixel in the captured image B is set to have a larger weight. According to this kind of an arrangement, since the contribution of the captured image A is decreased near the boundary Y in the above-described region 530, the change in color near the boundary Y between the region 520 and the region 530 can be decreased.

Various kinds of methods can be used as a more specific weight setting method by the positional weight calculation unit 430. In one embodiment, the position of the object in the field of view of an image capturing apparatus is the position, in the captured image, of the object present in the direction of interest. The positional weight calculation unit 430 can set, in accordance with the coordinates of the pixel in the captured image which includes the object, the weight so that a peripheral portion will be smaller than a central portion. In the case of the above-described example, when the coordinates $(u_i, v_i)$ of the pixel in the captured image corresponding to the coordinates $(u_o, v_o)$ of the pixel of interest in the reconstructed image are positioned in a peripheral portion, the weight of this captured image can be decreased.

As another method, the positional weight calculation unit 430 can determine a region which is visible from the input viewpoint in the reconstructed image. The positional weight calculation unit 430 can set a weight in the captured image obtained from this input viewpoint so that the weight will decrease as the position including the object in the determined region goes closer to the peripheral portion. For example, the positional weight calculation unit can set the weight so that the weight when the coordinates ($u_0$, $v_0$) of the pixel of interest in the reconstructed images are present in the peripheral portion will be smaller than that when the coordinates ($u_0$, $v_0$) of the pixel of interest in the reconstructed images are present in the central portion of the determined region.

Note that the method of setting a weight corresponding to the position in the field of view from the input viewpoint is not limited to the above-described methods. For example, it is possible to increase the weight of a captured image obtained by capturing an object in a line-of-sight direction that allows a higher quality image capturing operation to be performed. Also, it is possible to determine a region in which the color information of the captured image is to be reflected in the reconstructed image and set a weight to this captured image so that the weight will be decreased when the position including the object in the determined region is closer to the peripheral portion. This kind of arrangement is effective when limiting the number of captured images in which the color information is to be weighted and combined. In this case, a region which is visible from the input viewpoint in the reconstructed image and a region where the color information of the captured image is to be reflected may not match, and there may be a region which does not reflect the color information of the captured image even though the region is visible from the input viewpoint. For example, in a case in which two captured images are to be selected and combined based on the directions of the respective viewpoints, the color information of the captured image A and the captured image B may be used in one of the regions which are next to each other, and the color information of the captured image A and a captured image C may be used in the other. As a result, the color may sharply change in the boundary of these regions. On the other hand, by using such an arrangement, the weights of the captured image B and the captured image C are decreased in the periphery of this boundary and a sharp change in color can be suppressed.

The positional weight calculation unit 430 can calculate each positional weight when it becomes necessary for the processing by the pixel value calculation unit 440 or calculate, in advance, the positional weight for each pixel in the captured image before the processing by the pixel value calculation unit 440. In the latter case, the positional weight calculation unit 430 associates a weight calculated in the above-described manner to each pixel of the captured image. Subsequently, the pixel value calculation unit 440 uses, as the weight of the captured image, the positional weight associated with the pixel corresponding to the pixel of interest in the captured image when extracting the pixel value of the object in the pixel of interest (to be described later).

For each pixel of interest in the reconstructed image, the pixel value calculation unit 440 identifies, based on a distance map, the position of the object in the pixel of interest and extracts the pixel value of the object in the pixel of interest from the captured image. This processing can be performed in accordance with the above-described equations (1) to (4). Subsequently, the pixel value calculation unit 440 uses the weights calculated by the directional weight calculation unit 420 and the positional weight calculation unit 430 to weight and combine the pixel value extracted from each captured image. Thus, the pixel value (color information) for each pixel of interest in the reconstructed image is determined. That is, the pixel value calculation unit 440 generates the reconstructed image by the processing described above.

Finally, the image processing method performed by the image processing apparatus 100 according to this embodiment will be described with reference to FIG. 6A. In step S610, the input viewpoint information obtaining unit 310 obtains the input viewpoint information in the above-described manner. In step S620, the image obtaining unit 340 obtains each captured image in the above-described manner. In step S630, the output viewpoint information obtaining unit 320 obtains the output viewpoint information in the above-described manner. In step S640, the distance map obtaining unit 330 obtains a distance map in the above-described manner. In step S650, the rendering unit 350 generates a reconstructed image in the above-described manner. In step S660, the image output unit 360 outputs the reconstructed image in the above-described manner.

The processing performed by the rendering unit 350 will be described next with reference to FIG. 6B. In step S651, the distortion correction unit 410 performs distortion correction processing on each captured image in the above-described manner. Steps S652 to S657 are repeatedly performed by setting each pixel of the reconstructed image as a processing target. In these steps, each processing target pixel is called a pixel of interest. In step S653, for each captured image which is to be referred to when determining the pixel value related to a pixel of interest, the directional weight calculation unit 420 sets a weight based on the line-of-sight direction as described above. In step S654, for each captured image which is to be referred to when determining the pixel value related to the pixel of interest, the positional weight calculation unit 430 sets a weight based on the position of the object as described above. In step S655, the pixel value calculation unit 440 determines, as described above, the pixel value of the pixel of interest by weighting and combining the pixel values extracted from the respective captured images.

According to the above-described arrangement, it is possible to reduce a sense of incongruity by suppressing, in a reconstructed image obtained from a virtual viewpoint, a sharp change in color in the boundary portion of a region where different captured images are blended.

Implementation Example

The first embodiment described a case in which the pixel value obtained from each captured image is weighted and combined by setting a positional weight and a directional weight to each captured image. However, the present invention is not limited to such an embodiment, and various kinds of implementations can be adopted in consideration of the processing accuracy and the processing load. For example, pixel values obtained from two captured images can be weighted and combined to generate a reconstructed image based on two captured images. Furthermore, it is possible to generate, based on this reconstructed image and another captured image or a reconstructed image based on another captured image, a reconstructed image based on even more captured images. In addition, in a case in which the captured images are combined by dividing the process into a plurality of stages in this manner, a different combining method may be adopted for each stage. One such implementation example and one specific calculation method of the positional weight and the directional weight will be described hereinafter.

In step S650, the pixel value calculation unit 440 selects a pair of input viewpoints whose respective directions are closest to that of the output viewpoint. Here, assume that the first input viewpoint and the second input viewpoint have been selected. The pixel value calculation unit 440 extracts, in accordance with equations (1) to (4), the pixel value of each pixel in each captured image corresponding to the pixel of interest. Then, the pixel value calculation unit 440 calculates a pixel value $I_{12}$ by weighting and combining a pixel value $I_1$ extracted from the captured image obtained from the first input viewpoint and a pixel value $I_2$ extracted from the captured image obtained from the second input viewpoint by $$I_{nm}=((\min(w_n,w_m)\cdot w'_n+(1-\min(w_n,w_m))\cdot w_n)\cdot I_n+(\min(w_n,w_m)\cdot W'_m+(1-\min(w_n,w_m))\cdot w_m)\cdot I_m)/W \quad (5)$$

where $w_n$ and $w_m$ represent positional weights for the nth and mth input viewpoints, respectively. $w'_{n'}$ and $W'_{m'}$ represent directional weights for the nth and mth input viewpoints, respectively. W represents the sum of the weights.

Figure 7A:
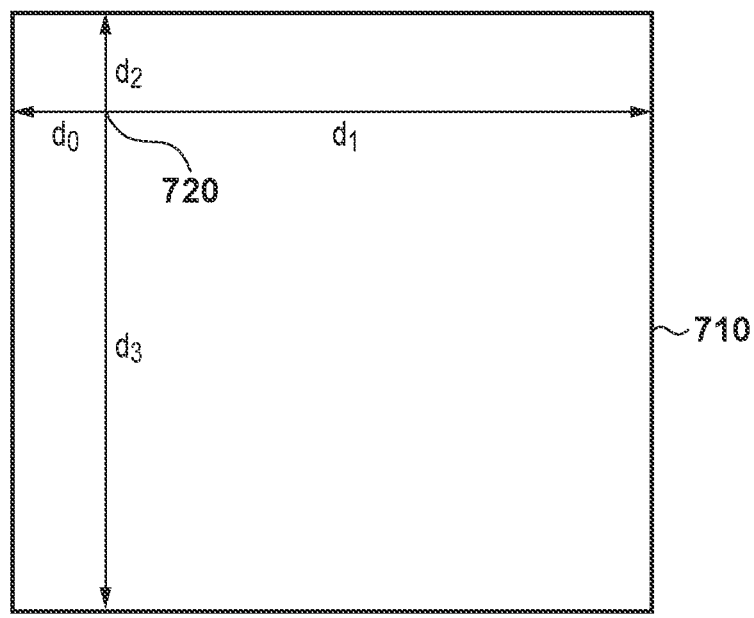
FIGS. 7A and 7B are views for explaining methods to calculate a positional weight and a directional weight according to an embodiment.

The positional weight $w_n$ is obtained by the positional weight calculation unit 430 in accordance with the position of a pixel in the captured image corresponding to the pixel of interest. As an example, if the distance from the edge of a captured image in which an object is present in the direction of interest exceeds a predetermined threshold, the positional weight calculation unit 430 can set a predetermined weight on the captured image. Also, if the distance from the edge of a captured image in which the object is present in the direction of interest is equal to or less than the predetermined threshold, the positional weight calculation unit 430 can set a weight which is less than the predetermined weight. The setting of such a positional weight can be performed in accordance with $$w_n=\min(d_0,d_1,d_2,d_3,d')/d' \quad (6)$$

where $d_0$ to $d_3$ indicate distances to edges, respectively, from a pixel 720 in a captured image 710 corresponding to the pixel of interest as shown in FIG. 7A. d' indicates an edge blend width, and the positional weight decreases when each distance until the edge is less than d'. The positional weight $w_m$ can also be obtained in the same manner.

Figure 7B:
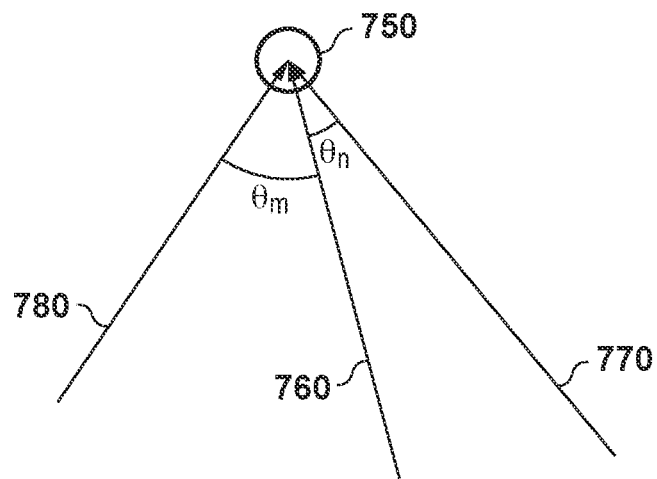

The directional weight calculation unit 420 obtains, in accordance with the direction from an input viewpoint to an object in the pixel of interest and the direction corresponding to the pixel of interest from the output viewpoint, the directional weights $w'_n$ and $w'_m$ by using $$w'_n=\theta_m/(\theta_n+\theta_m)$$

$$w'_m=\theta_n/(\theta_n+\theta_m) \quad (7)$$

where, as shown in FIG. 7B, $\theta_n$ indicates an angle formed by a direction 770 from one input viewpoint to an object 750 in the pixel of interest and a direction 760 corresponding to the pixel of interest from an output viewpoint. Also, $\theta_m$ indicates an angle formed by a direction 780 from another input viewpoint to the object 750 in the pixel of interest and the direction 760 corresponding to the pixel of interest from the output viewpoint. Note that each direction from an input viewpoint to the object in the pixel of interest can be easily calculated using the camera position of the input viewpoint and the world coordinates of the object.

The pixel value calculation unit 440 calculates a weight $w_{12}$ of the pixel value $I_{12}$ by $$w_{nm}=\max(w_n,w_m) \quad (8)$$

Similarly, the pixel value calculation unit 440 selects a pair of input viewpoints whose directions are third and fourth closest, respectively, to that of the output viewpoint. Next, a combined pixel value $I_{34}$ is calculated by using equation (5), and a weight $w_{34}$ of the combined pixel value $I_{34}$ is calculated using equation (8).

Furthermore, the pixel value calculation unit 440 combines the pixel value $I_{12}$ and the pixel value $I_{34}$. Pixel values $I_q$ and $I_r$ obtained based on the respective pairs of selected input viewpoints are combined to obtain a combined pixel value $I_s$ by $$I_s=w_q\cdot I_q+(1-w_q)\cdot I_r \quad (9)$$

where $I_q$ and $w_q$ represent a combined pixel value (for example, a pixel value obtained by combining the pixel value $I_{12}$ and the pixel values $I_{12}$ and $I_{34}$) based on $I_1$ and its weight, respectively. $I_r$ and $w_r$ represent a combined pixel value (for example, the pixel values $I_{34}$ and $I_{36}$) not based on $I_1$ and its weight, respectively. As explained earlier, weight of the combined pixel value can be calculated using equation (8). In other words, weight $w_s$ of the combined pixel value $I_s$ can be calculated as $w_s=\max(w_q, w_r)$.

The pixel value calculation unit 440 further selects a pair of input viewpoints whose directions are fifth and sixth closest, respectively, to that of the output viewpoint. The pixel value calculation unit uses equations (5) and (8) to calculate the combined pixel value $I_{36}$ and its weight $w_{56}$. Then, the pixel value calculation unit 440 uses equation (9) to combine the combined pixel value $I_{36}$ with a combined pixel value obtained by combining the pixel values $I_1$ to $I_4$. The pixel value of each pixel of interest is calculated by repeating this processing.

Figure 8C:
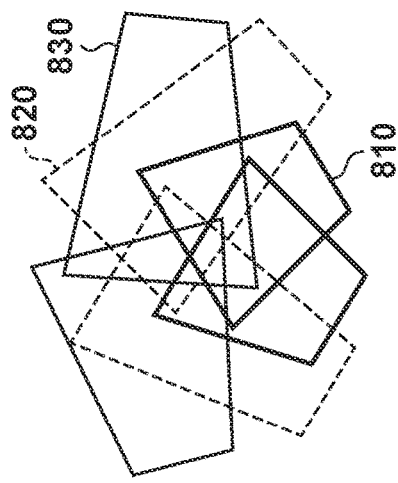
FIGS. 8A to 8C are views for explaining a pixel value calculation method according to an embodiment.
Figure 8B:
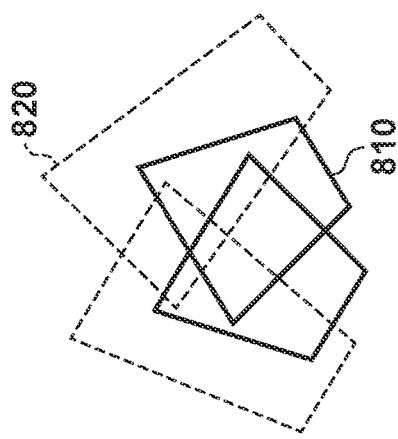
Figure 8A:
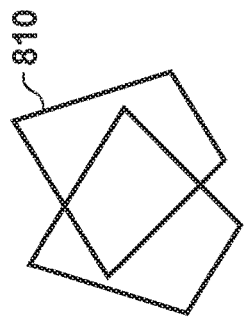

The combination method of pixel values based on this implementation method will be described with reference to FIGS. 8A to 8C. FIGS. 8A to 8C each show the field range of each input viewpoint (that is, the projection range of each captured image) in a reconstructed image. In this implementation example, when the pixel value of one pixel of interest is to be determined, the pixel value of a field range 810 of a first input viewpoint pair is determined based on captured images obtained from the first input viewpoint pair. Next, based on captured images obtained from a second input viewpoint pair, the pixel value of a field range 820 of the second input viewpoint pair is determined and combined with the pixel value of the field range 810 of the first input viewpoint pair. The pixel value of an additional field range 830 is sequentially determined based on captured images obtained from a third input viewpoint pair and additional input viewpoint pair, and the obtained pixel value is combined with the previously obtained pixel value.

According to this method, after pixel values are combined by selecting two input viewpoints whose directions are close to that of the output viewpoint, the obtained combined pixel value is further combined sequentially with a combined pixel value which has been obtained based on two additional input viewpoints. The combining of two pixel values according to equation (5) is the same as that in the first embodiment. The combining of combined pixel values according to equation (9) is also based on the same concept as that in the first embodiment. That is, the closer the directions of the two input viewpoints are to the direction of the output viewpoint, the weight $w_{nm}$ of a combined pixel value is increased, and the closer an object is to the periphery of the field range of the two input viewpoints, the weight $w_{nm}$ of a combined pixel value is decreased. In this manner, in the combining processing, two different methods can be combined. Further, it is possible to use the method according to this invention in combination with another method.

In particular, in this implementation example, the pixel value calculation unit 440 first performs the first processing of determining the color information of an object present in the direction of interest by selecting two image capturing apparatuses whose direction is close to that of a virtual viewpoint and using the captured images obtained by the selected image capturing apparatuses. This processing corresponds to the determination of the pixel value in the field range 810 of the first input viewpoint pair based on the captured images obtained from the first input viewpoint pair. Here, in this embodiment, according to equation (6), the positional weight $w_n$ is 1 in the central portion of the field of view of each input viewpoint and the directional weight $w_n'$ is less than 1. Hence, the weight $w_{nm}$ of the central portion of the field range 810 is 1 and the weight $w_{nm}$ becomes less than 1 in only the peripheral portion.

Accordingly, when the second processing of combining the pixel value of the field range 820 of the second input viewpoint pair with the pixel value of the field range 810 of the first input viewpoint pair in accordance with equation (9) is performed, the pixel value of the central portion of the field range 810 is not updated, and only the pixel value of the peripheral portion of the field range 810 is updated. In addition, a pixel value based on the captured images obtained from the second input viewpoint pair is used for a portion outside the field range 810. In sum, in the second processing, if an object present in the direction of interest is present in the central portion of the field of view of each of the two image capturing apparatuses (the first input viewpoint pair), the pixel value calculation unit 440 does not update the color information of the object determined by the first processing. Also, if the object present in the direction of interest is present in the peripheral portion of the field of view of each of the two image capturing apparatuses (the first input viewpoint pair), the pixel value calculation unit 440 performs the following processing. That is, the pixel value calculation unit 440 combines the color information of the object determined by the first processing with the color information of the object present in the direction of interest determined using the captured images obtained by image capturing apparatuses (the second input viewpoint pair) different from the two image capturing apparatuses. Then, if the object present in the direction of interest is present outside the fields of view of the two image capturing apparatuses, the pixel value calculation unit 440 performs the following processing. That is, the pixel value calculation unit 440 determines the color information of the object present in the direction of interest by using the captured images obtained by image capturing apparatuses (the second input viewpoint pair) different from the two image capturing apparatuses (the first input viewpoint pair).

In this implementation example, it is possible to combine images with even less sense of incongruity since importance is placed on captured images obtained from image capturing apparatuses whose directions are closer to that of the virtual viewpoint, in the generation of the reconstructed image. Note that, the specific combining method is not particularly limited, and instead of combining pixel values which are based on pairs of captured images, pixel values each obtained based one captured image may be combined.

Second Embodiment

In the first embodiment, for both an object such as a person whose position and shape change with time and an object such as a wall surface whose position rarely changes with time, an image from a virtual viewpoint was reconstructed based on the distance from the virtual viewpoint. On the other hand, for example, a background such as the wall surfaces, the floor, and the ceiling has a constant position and orientation relationship with each image capturing apparatus 108. Hence, if the position and the direction of the virtual viewpoint can be determined, nomography transformation can be performed on each captured image to generate an image of a region corresponding to this captured image in the background of a reconstructed image. Then, background images obtained from respective captured images can be blended to generate the reconstructed image of the background. Alternatively, equations (1) to (4) or the same method as that in the first embodiment can be used to generate an image of a person or the like which is other than the background and combine the generated image to the background to generate a reconstructed image that includes a person or the like. The second embodiment will describe this processing. Note that, in the following description, an object whose position and shape change with time will be called a moving object, and an object whose position and shape do not change with time will be called a background.

An image processing apparatus according to the second embodiment has the same arrangement as that of an image processing apparatus 100 shown in FIGS. 3 and 4, and only different points will be described below. The processing according to the second embodiment also can be performed in the same manner as that in the first embodiment, excluding the fact that the processes of steps S640 and S650 differ from those in the first embodiment.

Figure 9:
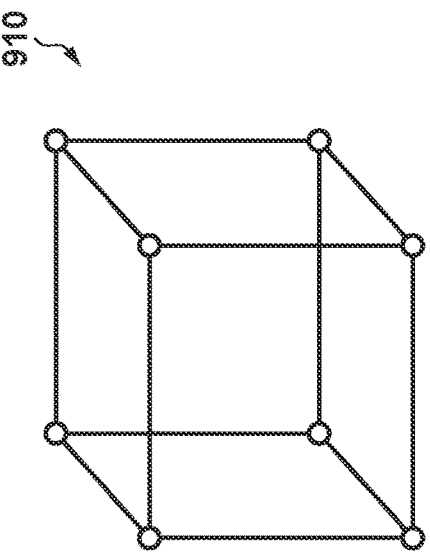
FIG. 9 is a view showing an example of a background model used in an embodiment.

In step S640, a distance map obtaining unit 330 obtains, in addition to a distance map from an object to a virtual viewpoint, the position information indicating the position of a background. In this embodiment, the background is represented by a model of the object which is formed by a plurality of surfaces. An example of the position information which is used in this embodiment is shown in FIG. 9. The background is the wall surfaces, the floor, and the ceiling of a gymnasium, and the position information of the background is represented by a four-vertex polygon model 910. The type of the position information is not particularly limited, as a matter of course. Note that if a reconstructed image of a moving object is not to be generated, the distance map from the virtual viewpoint to the object need not be obtained.

In step S640, the distance map obtaining unit 330 further determines a corresponding pixel in each captured image for each pixel of the reconstructed image. Here, a corresponding pixel points to a pixel including the same position in the background. Since the position and orientation relationship of an input viewpoint, the output viewpoint, and the background model is already known, an arbitrary method can be used to perform this processing. For example, by projecting a background plane included in the background model to a reconstructed image obtained from the output viewpoint and to a captured image obtained from the input viewpoint, a homography matrix for transforming a pixel position in the reconstructed image into a pixel position in a captured image can be calculated. In the case of this embodiment, the background plane included in the background model means one of the four-vertex polygons. By repeating this processing for each background plane, a background plane corresponding to each pixel in the reconstructed image is determined. Also, for each background plane, a homography matrix for calculating each pixel position corresponding to the pixel of interest in the reconstructed image can be obtained for each captured image. This homography matrix can be used to calculate, for each captured image, the position of a pixel corresponding to the pixel of interest in the reconstructed image. Note that, in this embodiment, in a case in which the pixel of interest does not correspond to any of the background planes and in a case in which the pixel of interest is in a region which includes a moving object, this processing of determining a pixel in each captured image corresponding to the pixel of interest need not be performed since the pixel value of the pixel of interest will be calculated in the same manner as that in the first embodiment.

The processing of step S650 will be described below. Step S651 can be performed in the same manner as that in the first embodiment. The pixel value of each pixel of interest is calculated by performing steps S652 to S656 for each pixel of the reconstructed image in the same manner as the first embodiment. The processing of calculating a pixel value of each pixel including a background in the reconstructed image will be described hereinafter. In the reconstructed image, the pixel value of each pixel which includes a moving object or a pixel in which a corresponding background plane is not present can be calculated, for example, by using the same method as that in the first embodiment. Additionally, in the reconstructed image, the identification of a region which includes a background and a region which includes a moving object can be performed by a conventionally known method. For example, each pixel having a pixel value difference is equal to or more than a threshold can be determined as belonging to a region which includes the moving object by comparing a distance map of a case with no presence of a moving object and a distance map of a case with the presence of the moving object.

The pixel in each captured image corresponding to the pixel of interest is known by performing the preceding processes. Hence, as in the same manner as in the first embodiment, a directional weight calculation unit 420 can calculate the directional weight of each captured image in step S653, and a positional weight calculation unit 430 can calculate the positional weight of each captured image in step S654. Then, a pixel value calculation unit 440 can determine the pixel value of the pixel of interest in step S655. For example, the pixel value calculation unit 440 can identify a pixel on the captured image corresponding to an object present in the direction of interest by using coordinate conversion between a background-model-surface projection from a virtual viewpoint to an image and a background-model-surface projection to each captured image. Subsequently, the pixel value calculation unit 440 can obtain the color information of each identified pixel as the color information of the object present in the direction of interest. Finally, the pixel value calculation unit 440 can determine the color information of the object present in the direction of interest by using the directional weight and the positional weight to weight and combine the color information extracted from each captured image.

According to this embodiment, in the case of a background image, since equations (1) to (4) need not be calculated to identify a pixel in each captured image which corresponds to the pixel in the reconstructed image, the processing speed can be increased.

Information indicating a transmitting direction can be set in the position information which indicates the position of the background. In this case, if the line of sight from a virtual viewpoint passes across the background in accordance with the transmitting direction of the background, it can be set so that the background will not be rendered. Also, if the line of sight from the virtual viewpoint passes across the background in accordance with a reflecting direction of the background, it can be set so that the background will be rendered. This processing allows control to be performed, for example, so as to render the floor if the virtual viewpoint is positioned above the floor and not to render the floor if the virtual viewpoint is positioned below the floor. According to such processing, it is possible to generate a reconstructed image from a freer virtual viewpoint.

As a more specific example, each surface of a polygon model indicating a position of the background can be provided with information that indicates whether the surface is a reflecting surface or a transmitting surface. Here, for one polygon, information indicating whether it is a reflecting surface or a transmitting surface can be provided separately for the front surface and the back surface. In a case in which the virtual viewpoint is present on the transmitting-surface side of the polygon, a corresponding pixel in a captured image can be determined for each pixel of the reconstructed image while handling this polygon as if it is absent. For example, when the virtual viewpoint is present on the transmitting-surface side of the polygon, the calculation of a nomography matrix and the projection processing for it need not be performed for this polygon. In such an example, it is possible to perform control in the above-described manner by setting, in a polygon that indicates the floor, information indicating the reflecting surface on the front surface (inner surface) and information indicating the transmitting surface on the back surface (outer surface). Note that if both the virtual point and an image capturing apparatus are present on the reflecting-surface side of the polygon, this polygon can be handled as if it is present.

Third Embodiment

The first embodiment described, as an implementation example, an example in which a reconstructed image is generated by combining images obtained from respective output viewpoints based on captured images from two pairs of input viewpoints. The third embodiment will describe an example in which a reconstructed image is generated based on captured images obtained from three or more input viewpoints.

In this embodiment, a pixel value of a pixel of interest on a reconstructed image is determined as follows. First, an input viewpoint whose captured image includes an object that is present in a direction of a pixel of interest (direction of interest) is selected from captured images obtained from respective input viewpoints. Next, as already described, a directional weight (or an angle weight) corresponding to the image capturing direction of the input viewpoint is calculated, and a positional weight corresponding to the position of the object in the field of view from the input viewpoint is calculated. Then, by combining the directional weight and the positional weight, a weight corresponding to the direction of the input viewpoint and the position of the object in the field of view of the input viewpoint is calculated. In this manner, a weight is set to each input viewpoint by considering both the positional weight and the directional weight (or the angle weight). Subsequently, a pixel value of the pixel of interest is determined by weighting and combining, in accordance with the weight set to each input viewpoint, the pixel value of each pixel of interest obtained in the above-described manner from the captured images of the respective input viewpoints.

Figure 10A:
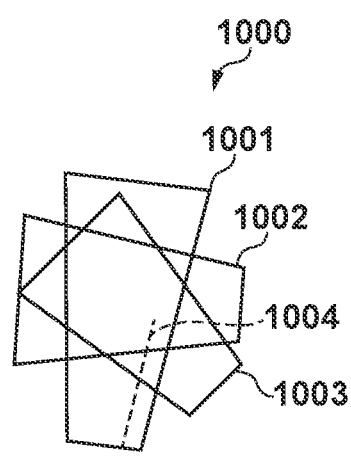
FIGS. 10A to 10D are views for conceptually explaining processing according to an embodiment.
Figure 10B:
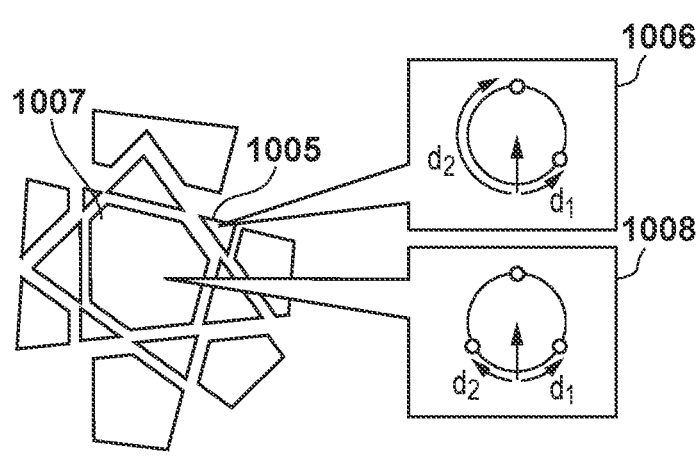
Figure 10C:
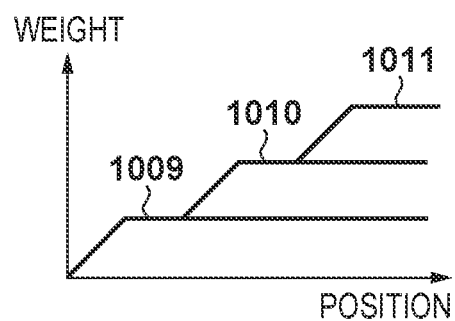

As a more specific example of a reconstructed image generation method according to this embodiment, a case in which three input viewpoints, as shown in FIGS. 10A to 10D, are present will be described hereinafter. FIG. 10A shows visible ranges 1001 to 1003 of respective input viewpoints 1 to 3 on a reconstructed image 1000. In this embodiment, a positional weight is set based on the distance from the edge of the captured image. Accordingly, the positional weight at a pixel on the reconstructed image 1000 increases as the pixel gets closer from the edge to the inside of a visible range, and is constant within the central region. For example, FIG. 10C shows the positional weight in each position along a line 1004. Regions 1009 to 1011 correspond to the positional weights of the input viewpoints 1 to 3, respectively.

In this embodiment, the reconstructed image 1000 is divided into regions in accordance with a combination of input viewpoints whose captured image include an object present in the direction of interest, and angle weights are set to each region. That is, weighting by an angle weight is performed for each combination of viewpoints from which the object corresponding to the pixel of interest is visible. FIG. 10B shows an example of such a division.

With respect to a region 1005 which is visible from the input viewpoints 1 and 2, an angle weight based on the input viewpoints 1 and 2 is set. The angle weight setting method in the region 1005 will be described with reference to a schematic view 1006. In the schematic view 1006, a large circle represents line-of-sight directions, an arrow represents a line-of-sight from an output viewpoint, and each small open circle represents a line-of-sight from each input viewpoint from which the object is visible. In the region 1005, an angle weight is set based on an angle $d_1$ (an angle formed by the line-of-sight from the input viewpoint 1 and the line-of-sight from the output viewpoint) and an angle $d_2$ (an angle formed by the line-of-sight from the input viewpoint 2 and the line-of-sight from the output viewpoint) shown in the schematic view 1006.

Also, as shown in a schematic view 1008, with respect to a region 1007, an angle weight is set based on the angle $d_1$ and the angle $d_2$. In this manner, in a case with three or more input viewpoints from which the object is visible, the angle weight is set based on the angle $d_1$ and the angle $d_2$ of two input viewpoints each having a line-of-sight or a distance close to the output viewpoint.

Figure 10D:
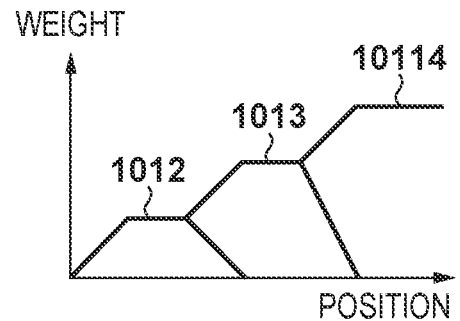

After the angle weight is set for each combination of input viewpoints, the setting of positional weights and reintegration are performed. FIG. 10D is a view showing the positional weight for each combination of input viewpoints along the line 1004. A region 1012 indicates the weight of the component of a combination formed by only the input viewpoint 1, a region 1013 indicates the weight of the components of a combination formed by the input viewpoints 1 and 2, and a region 1014 indicates the weight of the components of a combination formed by the input viewpoints 1, 2, and 3. The method of setting positional weight for each combination is not particularly limited to this. For example, the positional weight can be set for each combination based on the minimum positional weight among the positional weights set in the same manner as the first embodiment for each input viewpoint included in the combination. As a more specific example, there is a method of multiplying, sequentially from a combination including the maximum number of input viewpoints, the minimum positional weight of an input viewpoint from which an object is visible by the number of input viewpoints and assigning the obtained value as each positional viewpoint.

Figure 11:
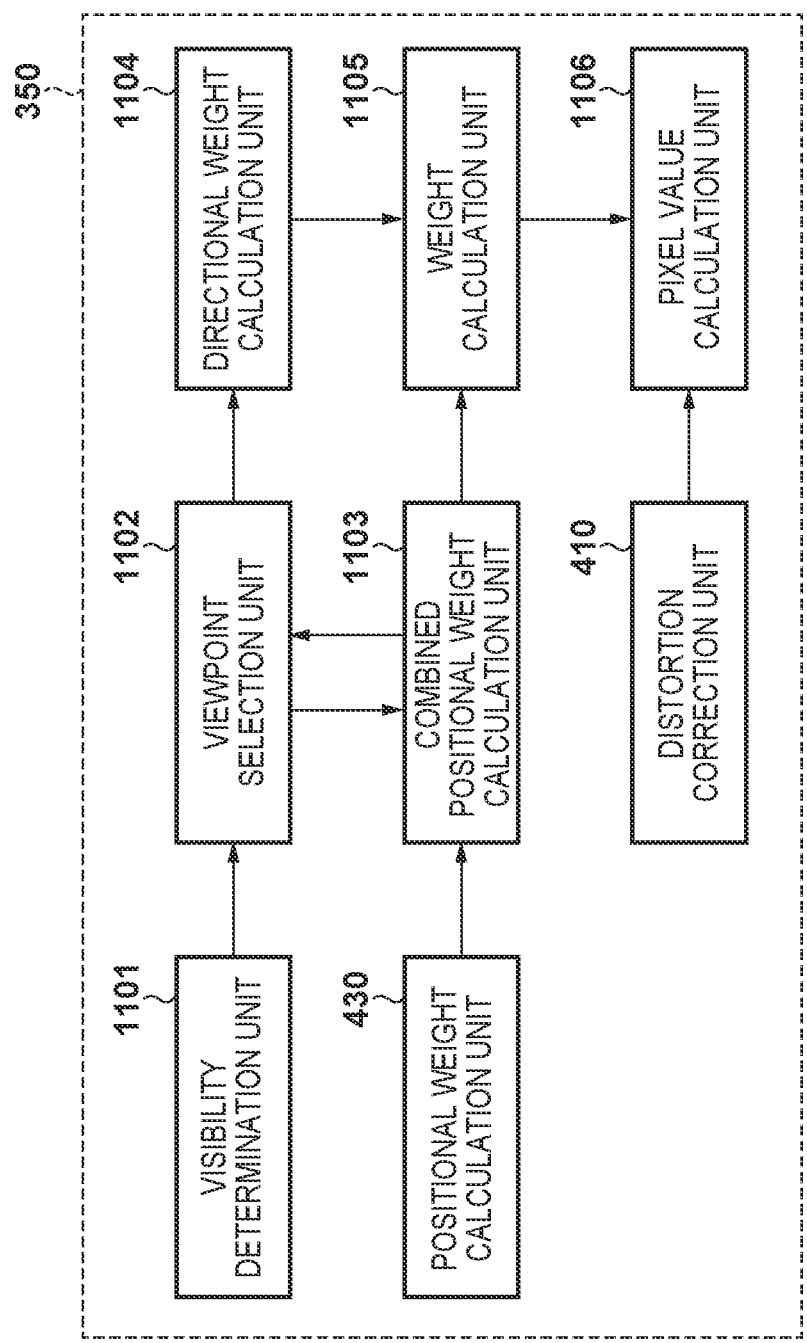
FIG. 11 is a block diagram showing an example of the functional arrangement of the image processing apparatus according to an embodiment.

FIG. 11 shows an arrangement example of a rendering unit 350 according to the third embodiment. The arrangements and processes of a distortion correction unit 410 and a positional weight calculation unit 430 are the same as those of the first embodiment. A visibility determination unit 1101 determines whether an object is visible from each of a plurality of image capturing apparatuses. For example, the visibility determination unit 1101 determines whether an object corresponding to a pixel of interest on the reconstructed image is visible on the captured image obtained from each input viewpoint and generates the determination result as visible viewpoint information.

A viewpoint selection unit 1102 generates viewpoint combination information (selection information) that indicates a combination of one or more image capturing apparatuses selected from the image capturing apparatuses from which the object is visible. For example, the viewpoint selection unit 1102 generates the viewpoint combination information by selecting, from combinations of input viewpoints from which the object is visible, a combination of one or more image capturing apparatuses. A combined positional weight calculation unit 1103 calculates a combined positional weight from the positional weights of respective input viewpoints based on the viewpoint combination information. The combined positional weight calculation unit 1103 also removes an input viewpoint from a selection target of the viewpoint selection unit 1102 by making each input viewpoint whose weight is not remaining ineffective and notifying the information of the input viewpoint whose weight is not remaining to the viewpoint selection unit 1102. A directional weight calculation unit 1104 determines each angle weight based on the viewpoint combination information. A weight calculation unit 1105 calculates a combined weight based on the combined positional weight and the angle weight. A pixel value calculation unit 1106 calculates each pixel value based on the combined weight and a distortion corrected image.

Figure 12:
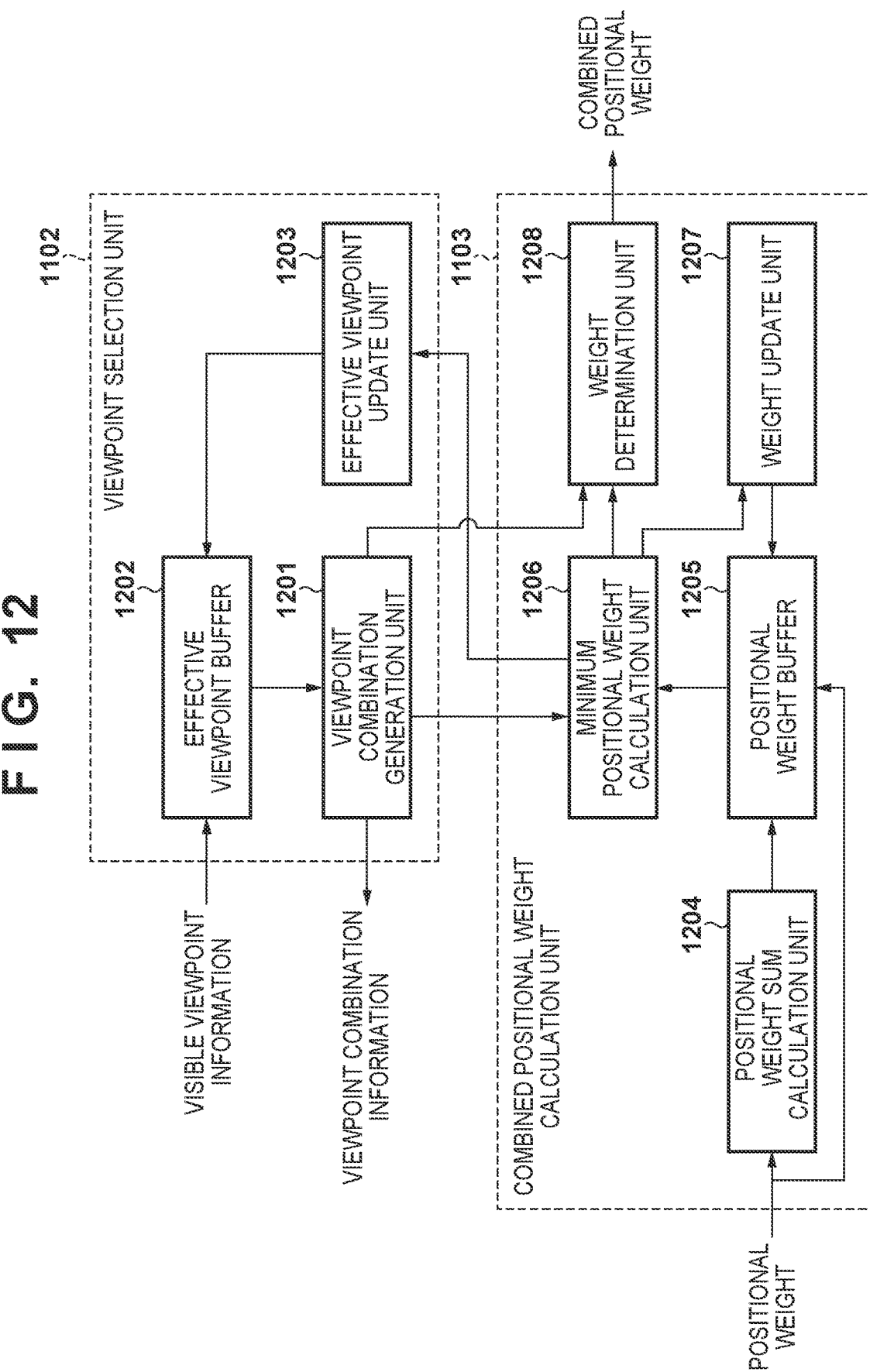
FIG. 12 is a block diagram showing an example of the functional arrangement of the image processing apparatus according to an embodiment.

FIG. 12 shows a detailed arrangement example of the viewpoint selection unit 1102 and the combined positional weight calculation unit 1103. A viewpoint combination generation unit 1201 generates the viewpoint combination information by selecting a combination of input viewpoints based on the effective viewpoint information stored in an effective viewpoint buffer 1202. Here, the viewpoint combination generation unit 1201 selects each input viewpoint that is effective at the point of selection. The effective viewpoint buffer 1202 is a buffer holding the effective viewpoint information, and the effective viewpoint information indicates whether each input viewpoint is effective or ineffective. Each time a pixel of interest changes on the reconstructed image, the effective viewpoint information is initialized based on the visible viewpoint information so that each input viewpoint from which the object is visible will be made effective.

A positional weight sum calculation unit 1204 calculates the sum of the positional weights of the respective input viewpoints. Note that the positional weight of an input viewpoint with no visibility, that is, a viewpoint from which the object corresponding to the pixel of interest on the reconstructed image is not visible, is set to 0 in this calculation. A positional weight buffer 1205 is a buffer that holds the positional weight of each input viewpoint and is initialized, each time the pixel of interest changes on the reconstructed image, by using the positional weight of each input viewpoint obtained by the positional weight calculation unit 430. More specifically, each value obtained by dividing the positional weight of an input viewpoint by the sum of the positional weights is stored in the positional weight buffer 1205 at the time of initialization.

Based on the viewpoint combination information, a minimum positional weight calculation unit 1206 selects an input viewpoint, from the selected input viewpoints, that has the minimum positional weight among the positional weights of the selected input viewpoints stored in the positional weight buffer 1205. An effective viewpoint update unit 1203 is notified of the information of the selected input viewpoint, and the effective viewpoint update unit 1203 updates the effective viewpoint buffer 1202 so that the selected input viewpoint will be an ineffective viewpoint. In addition, for each positional weight held by the positional weight buffer 1205, a weight update unit 1207 performs an updating processing of subtracting, from the positional weight of each input viewpoint selected by the viewpoint combination generation unit 1201, the positional weight of the input viewpoint selected by the minimum positional weight calculation unit 1206. A weight determination unit 1208 calculates a combined positional weight by multiplying the positional weight of the input viewpoint, which is selected by the minimum positional weight calculation unit 1206, by the number of input viewpoints selected by the viewpoint combination generation unit 1201.

Figure 13:
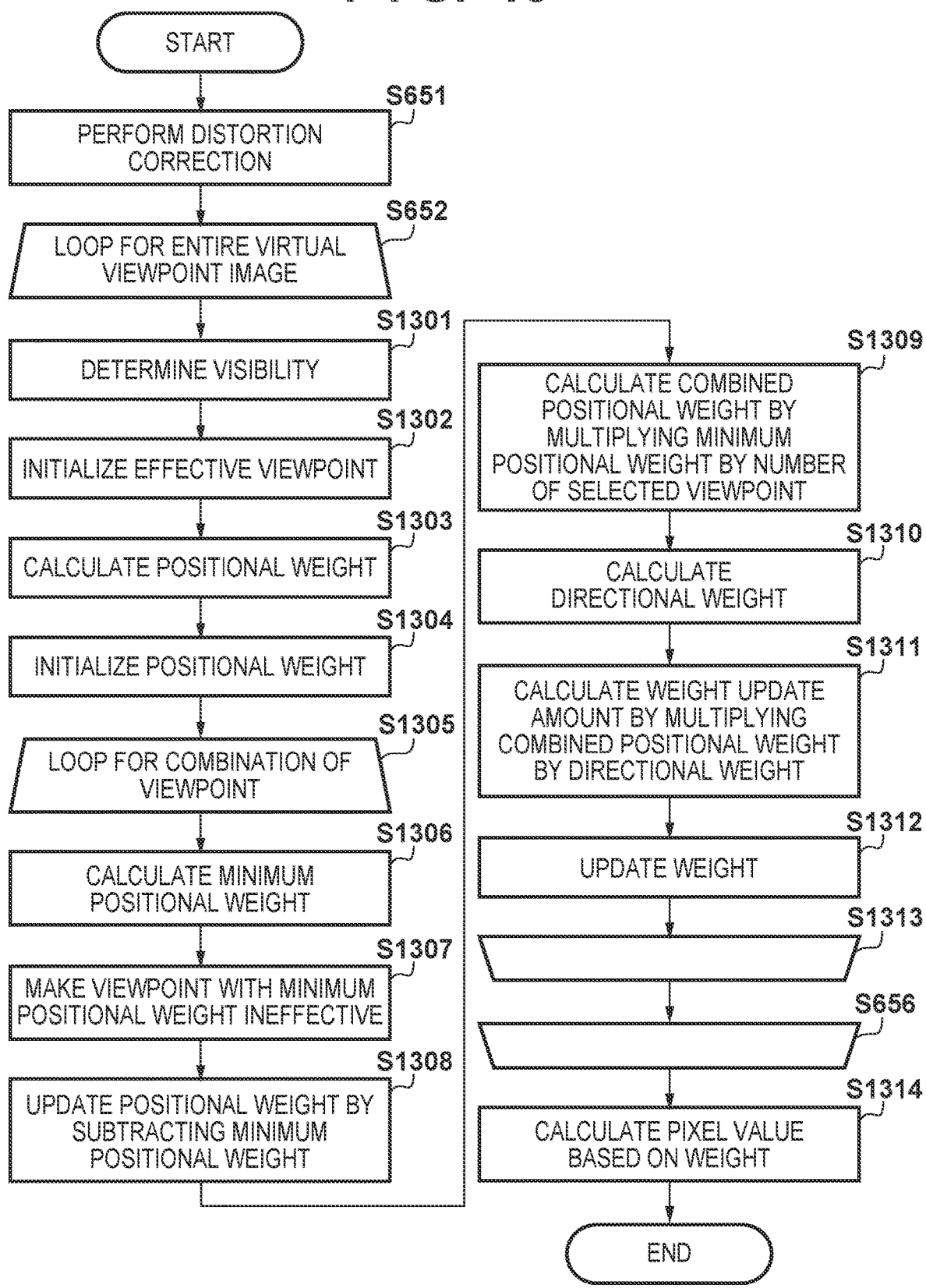
FIG. 13 is a flowchart of the processing according to an embodiment.

FIG. 13 shows the procedure of processing by the rendering unit 350 according to the third embodiment. Steps S651, S652, and S656 are performed in the same manner as those in the first embodiment. In step S1301, the visibility determination unit 1101 generates the visible viewpoint information in the above-described manner. In step S1302, the visibility determination unit 1101 initializes the effective viewpoint buffer 1202 based on the visible viewpoint information in the above-described manner. In step S1303, the positional weight calculation unit 430 calculates the positional weight of each input viewpoint in the above-described manner. In step S1304, the positional weight sum calculation unit 1204 calculates the sum of the positional weights of the input viewpoints in the above-described manner and initializes the positional weight buffer 1205.

In step S1305, the viewpoint combination generation unit 1201 generates the viewpoint combination information by selecting each combination of input viewpoints based on the effective input viewpoint information in the above-described manner. For example, the viewpoint combination generation unit 1201 selects all of the effective input viewpoints. In step S1306, the minimum positional weight calculation unit 1206 selects, based on the viewpoint combination information and the positional weights stored in the positional weight buffer 1205, an input viewpoint that has the minimum positional weight in the above-described manner. In step S1307, the effective viewpoint update unit 1203 updates the effective viewpoint buffer 1202 in the above-described manner, so that the input viewpoint selected in step S1306 is made ineffective. In step S1308, the weight update unit 1207 updates the effective viewpoint buffer 1202 in the above-described manner so that the positional weight of the input viewpoint selected in step S1306 is subtracted from the current weight of each input viewpoint selected in step S1305. In step S1309, the weight determination unit 1208 calculates the combined positional weight in the above-described manner by multiplying the positional weight of the input viewpoint selected in step S1306 by the number of input viewpoints selected in step S1305. The combined positional weight calculated in this manner is used as the combined positional weight of each combination of input viewpoints selected in step S1305.

In step S1310, the directional weight calculation unit 1104 determines a directional weight based on the viewpoint combination information in the above-described manner. This directional weight is used as the directional weight indicating the weight of each viewpoint for each combination of the input viewpoints selected in step S1305. In step S1311, the weight calculation unit 1105 calculates the weight update amount for each input viewpoint by multiplying the directional weight determined for each input viewpoint in step S1310 by the combined positional weight calculated in step S1309.

In step S1312, the weight calculation unit 1105 updates the cumulative weight of each input viewpoint by adding the update amount calculated in step S1311 to the cumulative weight of each input viewpoint obtained up to this point. Note that the cumulative weight of each input viewpoint is initialized to 0 each time a pixel of interest changes on the reconstructed image. The cumulative weight for each input viewpoint obtained up to this point is obtained by accumulating each weight update amount calculated based on viewpoint combination information which is different from the current viewpoint combination information. In step S1313, the viewpoint combination generation unit 1201 determines whether there are any remaining effective viewpoints. If there are no remaining effective viewpoints, the process advances to step S656. Otherwise, the process returns to step S1305, and the processing is repeated for another combination of effective viewpoints.

In step S1314, the pixel value calculation unit 1106 determines the pixel value of the pixel of interest based on the distortion corrected image of each input viewpoint and the cumulative weight of each input viewpoint. More specifically, the pixel value of the pixel of interest can be determined by weighting and combining the pixel value of each pixel on the distortion corrected image corresponding to the pixel of interest by using each cumulative weight. Here, the cumulative weight of each input viewpoint is a weight obtained in consideration of the positional weight and the directional weight.

FIGS. 14A to 14G exemplify the procedure of weight calculation processing according to this embodiment in a case with five input viewpoints. FIG. 14A shows how the positional weight of each input viewpoint changes by undergoing four updates. FIG. 14B shows how each effective viewpoint changes by undergoing four updates. In FIG. 14B, 1 indicates an effective input viewpoint and 0 indicates an ineffective viewpoint. Since the object corresponding to the pixel of interest is not visible from an input viewpoint 5, the input viewpoint 5 is an ineffective input viewpoint in the initial state and has a cumulative weight of 0. FIG. 14C shows the viewpoint with the minimum weight (the input viewpoint with the minimum positional weight), the minimum positional weight (the positional weight of the viewpoint with the minimum weight), the number of effective viewpoints, and the combined positional weight obtained in each update.

Among the initial values of respective effective viewpoints 1, 2, 3, and 4, the input viewpoint 2 is the viewpoint with the minimum weight, and its positional weight is 0.1. Accordingly, the minimum positional weight of 0.1 is subtracted from the positional weight of each of the input viewpoints 1, 2, 3, and 4 in the first update, and the input viewpoint 2 is made ineffective. Also, since the number of effective viewpoints is 4, the combined positional weight is 0.4. After the first update, among the effective viewpoints 1, 4, and 3, the input viewpoint 3 is the viewpoint with the minimum weight, and its positional weight is 0.1. Accordingly, the minimum positional weight of 0.1 is subtracted from the positional weight of each of the input viewpoints 1, 3, and 4 in the second update, and the input viewpoint 3 is made ineffective. Since the number of effective viewpoints is 3, the combined positional weight is 0.3. After the second update, among the effective viewpoints 1 and 4, the effective viewpoint 1 is the viewpoint with the minimum weight, and its positional weight is 0.1. Accordingly, the minimum positional weight of 0.1 is subtracted from the positional weight of each of the input viewpoints 1 and 4 in the third update, and the input viewpoint 1 is made ineffective. Also, since the number of effective viewpoints is 2, the combined positional weight is 0.2. After the third update, since the input viewpoint 4 is the only effective viewpoint, the input viewpoint 4 is the viewpoint with the minimum weight, and its positional weight is 0.1. Accordingly, the input viewpoint 4 is made ineffective in the fourth update, and the repetitive process stops. Also, since the number of effective viewpoints is 1, the combined positional weight is 0.1.

FIG. 14D shows each angle formed by a line-of-sight from an output viewpoint and a line-of-sight from each input viewpoint according to one example. Here, the line-of-sight from the output viewpoint is positioned between the line-of-sight of the input viewpoint 2 and the line-of-sight of the input viewpoint 3. The directional weight can be calculated, in accordance with equation (7), based on an angle formed by the output viewpoint and the closest input viewpoint from the output viewpoint in the counterclockwise direction and an angle formed by the output viewpoint and the closest input viewpoint from the output viewpoint in the clockwise direction. Here, it is possible to calculate and use, as the line-of-sight from the output viewpoint, a line-of-sight from the output viewpoint to the object corresponding to the pixel of interest on the reconstructed image. Also, it is possible to calculate and use, as the line-of-sight from an input viewpoint, a line-of-sight from the input viewpoint to the object corresponding to the pixel of interest on the reconstructed image. Note that the line-of-sight from an input viewpoint corresponds to the direction from the input viewpoint to the object in the pixel of interest described in the first embodiment, and the line-of-sight from the output viewpoint corresponds to the direction corresponding to the pixel of interest from the output viewpoint described in the first embodiment. Hence, lines-of-sight which are the same as those of the first embodiment can be used as the lines-of-sight from the output viewpoint and each input viewpoint. For example, instead of calculating a line-of-sight for each pixel, an optical-axis vector of each viewpoint or a vector from each viewpoint position to a reference point can be used as each line-of-sight. Furthermore, an angle formed by a line-of-sight may be an angle formed by a two-dimensional vector obtained by projecting a line-of-sight onto a reference surface or may use an angle formed by a line-of-sight in a three-dimensional space.

FIG. 14E shows an example of directional weights calculated based on angles formed by lines-of-sight shown in FIG. 14D. In accordance with step S1310, the column of "First Update" shows the directional weight of each input viewpoint with respect to each combination of input viewpoints 1 to 4. In the example of FIG. 14E, a pixel value component corresponding to each combination of input viewpoints 1 to 4 is set based on the captured image from the input viewpoint 2 and the captured image from the input viewpoint 3. In this embodiment, a pixel value component corresponding to a combination of two or more input viewpoints is represented by a combination of pixel values obtained from the captured images of two input viewpoints. Hence, weights have been set to two input viewpoints as described above. In the same manner, the columns of "Second Update", "Third Update", and "Fourth Update" show the directional weights of the combination of the input viewpoints 1, 3, and 4, the directional weights of the combination of the input viewpoints 1 and 4, and the directional weight of the combination formed by the input viewpoint 4, respectively.

FIG. 14F shows each value obtained by multiplying a combined weight shown in FIG. 14C by a directional weight shown in FIG. 14E, and each obtained value is used as a weight update amount. In the examples of FIGS. 14A to 14G, each pixel value component of the pixel of interest is represented by a combination of each pixel value component corresponding to the combination of the input viewpoints 1 to 4, each pixel value component corresponding to the combination of the input viewpoints 1, 3, and 4, each pixel value component corresponding to the combination of the input viewpoints 1 and 4, and each pixel value component corresponding to the combination formed by the input viewpoint 4. Each weight update amount shown in FIG. 14F corresponds to the weight of each input viewpoint used when a pixel value component corresponding to one combination of input viewpoints is calculated. When each weight update amount is added and accumulated for each update, the final weight of each input viewpoint, as shown in FIG. 14G, is obtained. The pixel value of the pixel of interest can be obtained by using this weight to perform weighted-averaging of the pixel value of each pixel corresponding to the pixel of interest in the captured image obtained from each input viewpoint. The calculation of the pixel value of each pixel corresponding to the pixel of interest in the captured image obtained from each input viewpoint can be performed in the same manner as that in the first embodiment.

The combined positional weight calculation method shown here is merely an example, and other methods can be used to calculate the combined positional weight. For example, instead of using a positional weight calculated for each input viewpoint, an edge blending width can be appropriately set for each region which has been divided in accordance with the combination of the input viewpoints, and a positional weight set in accordance with the distance from the edge of this region can be used as the combined positional weight. Also, instead of selecting all of the effective viewpoints, it is possible to select two input viewpoints such that an angle between the line-of-sight from the output viewpoint and the line-of-sight from the input viewpoint is the smallest, and repeatedly perform weight reduction processing on every combination of input viewpoints that include the selected input viewpoints. In addition, the directional weight calculation method is also merely an example, and other methods can be used to calculate the directional weight. For example, it is possible to set directional weights for three or more input viewpoints or set a non-linear weight. Furthermore, it is possible to blend, based on an angle formed by the reference surface and a line-of-sight, a weight calculated for the closest input viewpoint and an average weight set between input viewpoints from which the object is visible. According to such a method, it is possible to suppress a phenomenon in which the weight sharply changes near a position where the line-of-sight direction becomes perpendicular with respect to the reference surface.

Fourth Embodiment

An example in which captured images obtained from input viewpoints arranged in an approximately annular manner was shown until the third embodiment. The fourth embodiment will show an example of generating a reconstructed image by using, other than a main captured image, a background captured image or environmental information.

Figure 15:
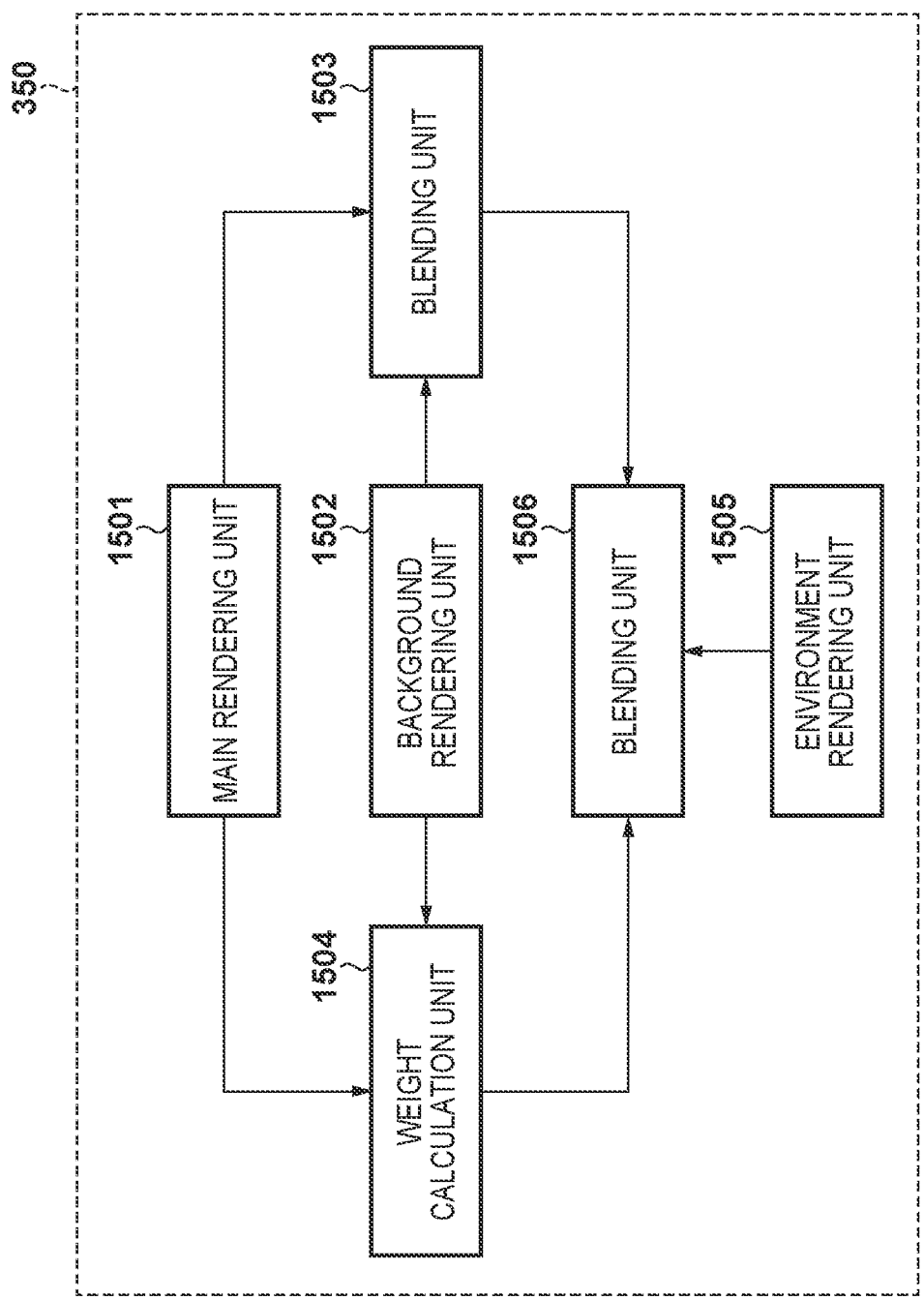
FIG. 15 is a block diagram showing an example of the functional arrangement of the image processing apparatus according to an embodiment.

FIG. 15 shows an arrangement example of a rendering unit 350 according to the fourth embodiment. A main rendering unit 1501 and a background rendering unit 1502 generate a main rendered image and a background rendered image, respectively, by having the same arrangement and performing the same processes as those in the rendering unit 350 according to each of the first to third embodiments. For example, the main rendering unit 1501 can generate an image of an object which is a moving object as a main rendered image, and the background rendering unit 1502 can generate an image of an object which is the background as a background rendered image. This kind of processing can be performed by applying, for example, the method of the second embodiment. In this embodiment, the main rendering unit 1501 and the background rendering unit 1502 can perform rendering by using captured images obtained from different groups of image capturing apparatuses arranged in an approximately annular manner. That is, the main rendering unit 1501 determines the color information based on the main captured images obtained by a group of main image capturing units. Also, the background rendering unit 1502 determines the color information based on the background captured images obtained by a group of background image capturing units.

In addition, the main rendering unit 1501 and the background rendering unit 1502 generate, other than the rendered images, a main weight map and a background weight map that indicate the positional weight for each pixel of a rendered image. Each weight map stores, with respect to each pixel of a rendered image, the maximum positional weight among the positional weights, for all input viewpoints, corresponding to the pixel. A blending unit 1503 determines the color information of the object by blending (combining) the main rendered images and the background rendered images based on the respective weight maps, thereby outputting a blended image. As an example of a blending method, there is a method of multiplying the main rendered image by a positional weight, multiplying the background rendered image by (1−the positional weight), and averaging the obtained products. As each positional weight to be used in this case, a normalized positional weight shown in the main weight map can be used. Also, a weight calculation unit 1504 generates a new weight map from the main weight map and the background weight map. The weight calculation unit 1504 can calculate the maximum value of each weight shown in the main weight map and each weight shown in the background weight map as the weight to be shown in the new weight map.

An environment rendering unit 1505 generates an environment rendered image. The environment rendering unit 1505 can generate an environment rendered image by performing rendering by using an environment map in which a pixel value has been defined with respect to each line-of-sight direction or by using environmental information such as the color information indicating a single color. A blending unit 1506 can generate a final output image by blending the blended image generated by the blending unit 1503 and the environment rendered image. Here, the blending unit 1506 can perform blending, in the same manner as the blending unit 1503, based on the weight map generated by the weight calculation unit 1504.

FIG. 16 shows the procedure of processing performed by the rendering unit 350 according to the fourth embodiment. In step S1601, the main rendering unit 1501 generates a main rendered image based on each main captured image. In step S1602, the background rendering unit 1502 generates a background rendered image based on each background captured image. In step S1603, the environment rendering unit 1505 generates an environment rendered image based on the environmental information. In step S1604, the blending unit 1503 blends the main rendered image and the background rendered image. In step S1605, the weight calculation unit 1504 combines the main weight map and the background weight map. In step S1606, the blending unit 1506 blends the blended image generated in step S1604 and the environment rendered image based on the weight map obtained in step S1605.

This embodiment showed an example in which an image was generated by using the main captured images, the background captured images, and the environmental information. However, the number of images to be used may be larger or smaller than that described above. In addition, the blending method shown here is merely an example, and other methods may be used. For example, the blending ratio of the images may be changed based on an angle formed by the reference surface and a line-of-sight or based on the position of the output viewpoint.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-170069, filed Aug. 31, 2016, and Japanese Patent Application No. 2017-156642, filed Aug. 14, 2017, which are hereby incorporated by reference herein in their entirety.

What is claimed is:

1. An image processing apparatus comprising:
one or more memories that store a set of instructions; and
one or more processors that execute the instructions to:

obtain position and orientation information of a virtual viewpoint, position and orientation information of a plurality of image capturing apparatuses, and position information of an object;

obtain two or more captured images each acquired by each of two or more image capturing apparatuses selected from the plurality of image capturing apparatuses, the two or more image capturing apparatuses being selected based on the obtained position and orientation information of the virtual viewpoint, the obtained position and orientation information of the plurality of image capturing apparatuses, and the obtained position information of the object;

set a weight to be used for combining color information, the weight corresponding to a pixel in each of the obtained two or more captured images, the pixel corresponding to a pixel representing the object in a virtual viewpoint image corresponding to the virtual viewpoint;

determine color information of the object in the virtual viewpoint image by combining, based on the set weight, the color information of the pixel in each of obtained two or more captured images, the pixel corresponding to the pixel representing the object in the virtual viewpoint image; and generate the virtual viewpoint image based on the determined color information, wherein the weight in a case where a distance from an edge of the captured image to the pixel, on the captured image, corresponding to a pixel representing the object in the virtual viewpoint image is a first distance is smaller than the weight in a case where a distance from an edge of the captured image to the pixel, on the captured image, corresponding to a pixel representing the object in the virtual viewpoint image is a second distance longer than the first distance.

2. The apparatus according to claim 1, wherein the one or more processors execute the instructions to determine the color information of the object by combining color information determined by the image processing apparatus based on captured images obtained from a first group of image capturing apparatuses and color information determined by the image processing apparatus based on captured images obtained from a second group of image capturing apparatuses.

3. The apparatus according to claim 1, wherein a position of the object changes with time.

4. The apparatus according to claim 1, wherein a position of the object does not change with time.

5. The apparatus according to claim 1, wherein the weight in a case where the distance from an edge of the captured image to the pixel, on the captured image, corresponding to the pixel representing the object in the virtual viewpoint image is not more than a threshold is smaller than the weight in a case where the distance from the edge of the captured image to the pixel, on the captured image, corresponding to a pixel representing the object in the virtual viewpoint image exceeds the threshold.

6. The apparatus according to claim 1, wherein the weight in a case where the distance from an edge of the captured image to the pixel, on the captured image, corresponding to the pixel representing the object in the virtual viewpoint image exceeds a threshold is a constant value.

7. The apparatus according to claim 1, wherein the one or more processors execute the instructions to set the weight based on the position of the pixel in each of the two or more captured images, corresponding to the pixel representing the object in the virtual viewpoint image.

8. The apparatus according to claim 1, wherein the weight corresponds to the position of the pixel in each of the two or more captured images, corresponding to the pixel representing the object in the virtual viewpoint image and an image capturing direction of each of two or more image capturing apparatuses which corresponds to a different one of the two or more captured images.

9. The apparatus according to claim 8, wherein the one or more processors execute the instructions to set the weight based on the position of the pixel in each of the two or more captured images, corresponding to the pixel representing the object in the virtual viewpoint image and an image capturing direction of each of two or more image capturing apparatuses which corresponds to a different one of the two or more captured images.

10. The apparatus according to claim 1, wherein the weight corresponding to a position of a pixel, on the captured image, whose distance from the edge of the captured image is the first distance is smaller than the weight corresponds to a position of a pixel, on the captured image, whose distance from the edge of the captured image is the second distance longer than the first distance.

11. An image processing method comprising:

obtaining position and orientation information of a virtual viewpoint, position and orientation information of a plurality of image capturing apparatuses, and position information of an object;

obtaining two or more captured images each acquired by each of two or more image capturing apparatuses selected from the plurality of image capturing apparatuses, the two or more image capturing apparatuses being selected based on the obtained position and orientation information of the virtual viewpoint, the obtained position and orientation information of the plurality of image capturing apparatuses, and the obtained position information of the object;

setting a weight to be used for combining color information, the weight corresponding to a pixel in each of the obtained two or more captured images, the pixel corresponding to a pixel representing the object in a virtual viewpoint image corresponding to the virtual viewpoint;

determining color information of the object in the virtual viewpoint image by combining, based on the set weight, the color information of the pixel in each of obtained two or more captured images, the pixel corresponding to the pixel representing the object in the virtual viewpoint image; and generating the virtual viewpoint image based on the determined color information, wherein the weight in a case where a distance from an edge of the captured image to the pixel, on the captured image, corresponding to a pixel representing the object in the virtual viewpoint image is a first distance is smaller than the weight in a case where a distance from an edge of the captured image to the pixel, on the captured image, corresponding to a pixel representing the object in the virtual viewpoint image is a second distance longer than the first distance.

12. A non-transitory computer-readable medium storing one or more programs which, when executed by a computer comprising one or more processors and a memory, causes the computer to:

obtain position and orientation information of a virtual viewpoint, position and orientation information of a plurality of image capturing apparatuses, and position information of an object;

obtain two or more captured images each acquired by each of two or more image capturing apparatuses selected from the plurality of image capturing apparatuses, the two or more image capturing apparatuses being selected based on the obtained position and orientation information of the virtual viewpoint, the obtained position and orientation information of the plurality of image capturing apparatuses, and the obtained position information of the object;

set a weight to be used for combining color information, the weight corresponding to a pixel in each of the obtained two or more captured images, the pixel corresponding to a pixel representing the object in a virtual viewpoint image corresponding to the virtual viewpoint;

determine color information of the object in the virtual viewpoint image by combining, based on the set weight, the color information of the pixel in each of obtained two or more captured images, the pixel corresponding to the pixel representing the object in the virtual viewpoint image; and generate the virtual viewpoint image based on the determined color information, wherein the weight in a case where a distance from an edge of the captured image to the pixel, on the captured image, corresponding to a pixel representing the object in the virtual viewpoint image is a first distance is smaller than the weight in a case where a distance from an edge of the captured image to the pixel, on the captured image, corresponding to a pixel representing the object in the virtual viewpoint image is a second distance longer than the first distance.

* * * * *